(12) United States Patent
Fernandez-Ruiz et al.

(10) Patent No.: US 9,268,546 B2
(45) Date of Patent: Feb. 23, 2016

(54) DEPLOYMENT AND HOSTING OF PLATFORM INDEPENDENT APPLICATIONS

(71) Applicant: Yahoo! Inc., Sunnyvale, CA (US)

(72) Inventors: Bruno Fernandez-Ruiz, Mountain View, CA (US); Daryl Mun-Kid Low, San Jose, CA (US); Martin F. N. Cooper, Fremont, CA (US); Dirk Koehler, San Francisco, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 13/729,162

(22) Filed: Dec. 28, 2012

(65) Prior Publication Data

US 2013/0263112 A1    Oct. 3, 2013

Related U.S. Application Data

(63) Continuation-in-part of application No. 13/437,494, filed on Apr. 2, 2012, and a continuation-in-part of application No. 13/437,462, filed on Apr. 2, 2012.

(60) Provisional application No. 61/568,056, filed on Dec. 7, 2011.

(51) Int. Cl.
*G06F 9/445* (2006.01)
*G06F 9/50* (2006.01)
*G06F 9/44* (2006.01)

(52) U.S. Cl.
CPC .. *G06F 8/60* (2013.01); *G06F 9/50* (2013.01); *G06F 9/5011* (2013.01); *G06F 9/4443* (2013.01)

(58) Field of Classification Search
CPC ............ G06F 8/60; G06F 9/50; G06F 9/4443; G06F 9/5011
USPC ................... 717/101–103, 171–173, 176–178
See application file for complete search history.

(56) References Cited

U.S. PATENT DOCUMENTS

| | | | |
|---|---|---|---|
| 6,052,527 A | 4/2000 | Delcourt | |
| 7,035,279 B2* | 4/2006 | Bruckman | .................... 370/460 |
| 7,275,243 B2* | 9/2007 | Gibbons et al. | ............... 717/159 |
| 7,779,027 B2 | 8/2010 | James et al. | |
| 8,074,217 B2 | 12/2011 | James et al. | |
| 8,108,711 B2 | 1/2012 | Meijer et al. | |
| 8,219,028 B1 | 7/2012 | Flamholz | |
| 8,291,341 B2 | 10/2012 | Tseng et al. | |
| 8,307,331 B2 | 11/2012 | Warila et al. | |
| 8,516,435 B2 | 8/2013 | Akkiraju et al. | |
| 8,922,485 B1 | 12/2014 | Lloyd | |
| 2003/0237050 A1 | 12/2003 | Davidov et al. | |

(Continued)

OTHER PUBLICATIONS

Moshchuk et al., "Resource Management for Web Applications in ServiceOS", May 2010, Microsoft Research, Retrieved from http://research.microsoft.com/apps/pubs/default.aspx?id=131540, 15 pages.*

(Continued)

*Primary Examiner* — Ted T Vo

(74) *Attorney, Agent, or Firm* — Pillsbury Winthrop Shaw Pittman LLP

(57) ABSTRACT

Method, system, and programs for deployment of applications are disclosed. An application capable of being executed in a plurality of different formats is provisioned. The application is deployed for execution by a client device and a server. Resources are dynamically allocated for execution of the application.

15 Claims, 23 Drawing Sheets

(56) References Cited

U.S. PATENT DOCUMENTS

| | | |
|---|---|---|
| 2004/0003400 A1 | 1/2004 | Carney et al. |
| 2005/0022188 A1 | 1/2005 | Tameshige et al. |
| 2006/0101449 A1 | 5/2006 | Gatz |
| 2006/0206882 A1 | 9/2006 | Illowsky et al. |
| 2006/0218536 A1 | 9/2006 | Kirilline et al. |
| 2007/0083603 A1 | 4/2007 | Faez et al. |
| 2007/0150856 A1 | 6/2007 | Warner et al. |
| 2008/0127217 A1 | 5/2008 | Wang |
| 2008/0271045 A1 | 10/2008 | Le Roy et al. |
| 2009/0113250 A1 | 4/2009 | Meijer et al. |
| 2009/0132197 A1 | 5/2009 | Rubin et al. |
| 2009/0287914 A1 | 11/2009 | Shah et al. |
| 2009/0325566 A1 | 12/2009 | Bell |
| 2010/0005396 A1 | 1/2010 | Nason et al. |
| 2011/0072082 A1 | 3/2011 | Fujiwaka |
| 2011/0225417 A1 | 9/2011 | Maharajh et al. |
| 2011/0258595 A1 | 10/2011 | Clevenger |
| 2011/0298816 A1 | 12/2011 | Liu et al. |
| 2011/0321028 A1 | 12/2011 | Evans |
| 2013/0046878 A1 | 2/2013 | Fryc et al. |
| 2013/0047150 A1 | 2/2013 | Malasky et al. |
| 2013/0145482 A1 | 6/2013 | Ricci |
| 2013/0152066 A1 | 6/2013 | Fernandez-Ruiz et al. |
| 2014/0007048 A1 | 1/2014 | Qureshi |

OTHER PUBLICATIONS

R. Haratsch, "A client-server architecture for providing client-specific network services on the application layer", 2001, In Proceedings of APC 2001, Munich, Germany, 10 pages.*

Kosta et al., "Unleashing the Power of Mobile Cloud Computing using ThinkAir", May 2011, retrieved from Cornell University Library, http://arxiv.org/abs/1105.3232, 17 pages.*
International Search Report corresponding to PCT/US2012/64786 dated Mar. 28, 2013.
Preliminary Report on Patentability issued on Jun. 19, 2014 in PCT/US2012/064786.
Office Action issued on Jun. 12, 2014 in U.S. Appl. No. 13/437,494.
Office Action issued on Jul. 25, 2014 in U.S. Appl. No. 13/437,462.
Office Action issued on May 9, 2014 in U.S. Appl. No. 13/550,914.
Office Action issued on Nov. 14, 2014 in U.S. Appl. No. 13/550,914.
Notice of Allowance issued on Nov. 18, 2014 in U.S. Appl. No. 13/437,462.
Office Action issued on Jan. 26, 2015 in U.S. Appl. No. 13/719,437.
Office Action issued on Oct. 23, 2014 in U.S. Appl. No. 13/719,515.
Office Action issued on Sep. 9, 2014 in U.S. Appl. No. 13/719,437.
Office Action issued on Dec. 24, 2014 in U.S. Appl. No. 13/437,494.
Office Action issued on May 6, 2015 in U.S. Appl. No. 13/437,494.
Notice of Allowance issued on May 8, 2015 in U.S. Appl. No. 13/550,914.
Office Action issued on Feb. 11, 2015 in U.S. Appl. No. 13/719,515.
Office Action issued on May 14, 2015 in U.S. Appl. No. 13/719,437.
Office Action issued on Jun. 4, 2015 in U.S. Appl. No. 13/719,515.
Notice of Allowance issued Aug. 19, 2015 in U.S. Appl. No. 13/437,494.
Chris Tucker, "Opium: Optimal Package Install/Uninstall Manager," 29th International Conference on Software Engineering, 2007.
Notice of Allowance issued Sep. 17, 2015 in U.S. Appl. No. 13/719,437.
Office Action issued Sep. 25, 2015 in U.S. Appl. No. 13/719,515.

* cited by examiner

Client-side Application Execution

DEPLOYMENT AND HOSTING OF PLATFORM INDEPENDENT APPLICATIONS

CROSS-REFERENCE TO RELATED APPLICATIONS

The present application is a continuation in part of U.S. application Ser. No. 13/437,494, filed 2 Apr. 2012 and U.S. application Ser. No. 13/437,462, filed 2 Apr. 2012, both of which claim the benefit of priority to U.S. Provisional Application Ser. No. 61/568,056 filed 7 Dec. 2011, all of which are incorporated herein by reference in their entirety.

FIELD

The present disclosure relates to methods, systems and programming for deployment and hosting of platform independent applications.

BACKGROUND OF THE INVENTION

Recent advancements in technology have resulted in increased usage of different devices and operating systems. Devices such as laptops, smartphones, tablets, and computer systems may operate on a variety of operating systems, including Android, Windows, OS X, BlackBerry, and iOS. Users of these devices and operating systems have grown to expect seamless access and increased functionality and interactivity. As a result, users also expect intercompatibility between different devices. To adhere to the high standards set by users, developers and content providers must maintain and develop several versions and permutations or each application written for each different device and each different operating system. For example, the same smartphone application must often be written for at least each of the Android, iPhone, and Windows phone platforms, to say nothing of additional applications that may be needed for specific smartphones manufactured by Samsung, LG, HTC, T-Mobile, Blackberry, etc. Not only must these different versions of applications be developed, but they must also be tested, maintained, and stored. Furthermore, even if the applications are developed to be as similar as possible across different devices and platforms, users may still experience different results when accessing the same application from different smartphones, or from a personal computer, or laptop.

SUMMARY

The embodiments described herein relate to methods, systems, and programming for deployment and hosting of applications.

In an embodiment, a method implemented on at least one computing device, each computing device having at least one processor, storage, and a communication platform connected to a network for deployment of applications that are interoperable across different device platforms is disclosed. An application capable of being executed in a plurality of different formats is provisioned. The application is deployed for execution by a client device and a server. Resources are dynamically allocated for execution of the application.

In an embodiment, a system for deployment of applications that are interoperable across different device platforms is disclosed. The system comprises a provisioning unit, a deployment unit, and an analytics unit. The provisioning unit is configured for provisioning an application capable of being executed in a plurality of different device formats. The deployment unit is configured for deploying the application for execution by a client device and a server. The analytics unit is configured for dynamically allocating resources for execution of the application.

Other concepts relate to software for implementing provision of packages to applications is disclosed. A software product, in accord with this concept, includes at least one machine-readable non-transitory medium and information carried by the medium. The information carried by the medium may be executable program code data regarding parameters in association with a request or operational parameters.

In an embodiment, a machine readable and non-transitory medium having information recorded thereon for deployment of applications, where when the information is read by the machine, causes the machine to perform the steps comprising: provisioning an application capable of being executed in a plurality of different device formats; deploying the application for execution by a client device and a server; and dynamically allocating resources for execution of the application.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

In the following detailed description, numerous specific details are set forth by way of example in order to provide a thorough understanding of the relevant embodiments described herein. However, it should be apparent to those skilled in the art that the present embodiments may be practiced without such details. In other instances, well known methods, procedures, components and/or circuitry have been described at a relatively high-level, without detail, in order to avoid unnecessarily obscuring aspects of the embodiments described herein.

The present disclosure relates to methods, systems and programming developing and hosting platform independent applications. More particularly, the present disclosure is directed to methods, systems, and programming for developing applications that may be executed on any device platform. The embodiments described herein provide a platform that facilitates development and hosting of applications using a cloud infrastructure. The development and hosting platform may deploy applications to client devices to be run locally at the client device or at a server. The deployed applications may also run off-line locally at the client device. The platform provides a web application framework that allows an application to execute both at a client or browser side or at a server side. As a result, application developers do not need to write different code for a server backend and a browser backend. Additionally, an application may run at the server side even if the client side encounters problems executing the application, because the applications all use a single code base. Furthermore, applications may run in a hybrid runtime utilizing resources of both a client device or client browser and a server.

Figure 1:
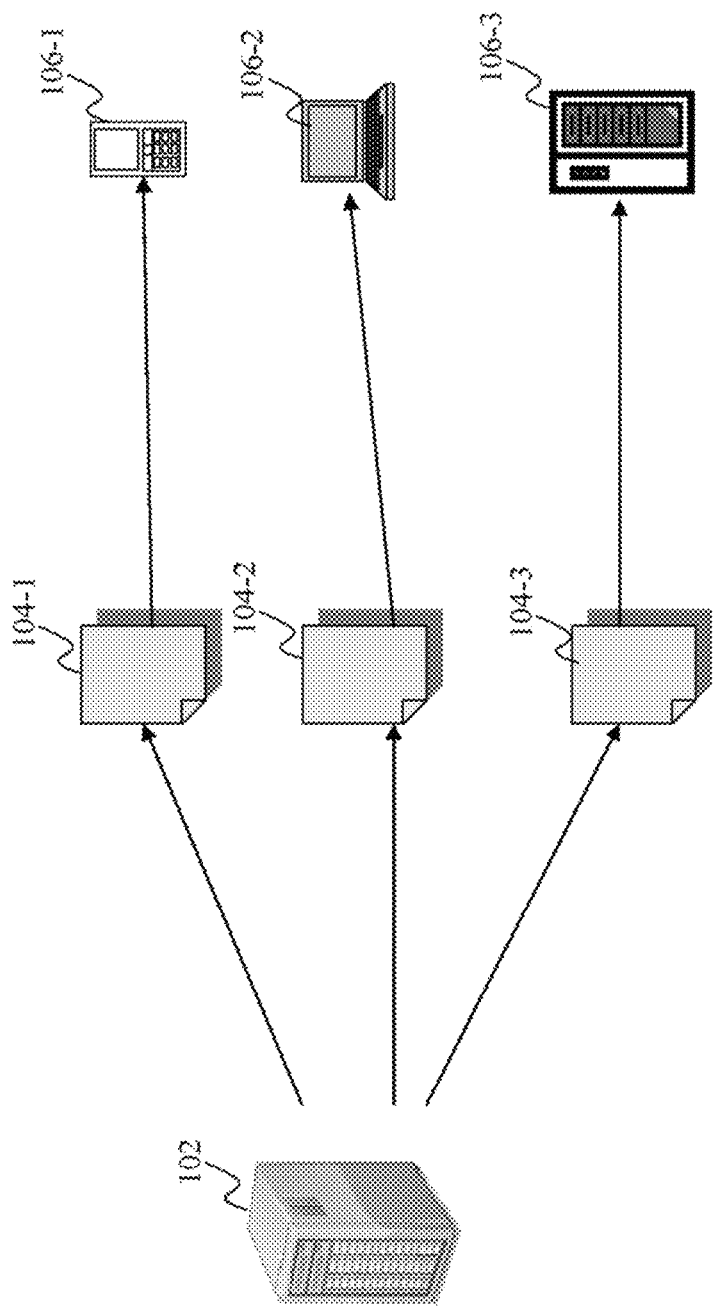
FIG. 1 depicts an exemplary prior art system for developing and deploying applications to different devices.

FIG. 1 depicts an exemplary prior art system for developing and deploying applications to different devices. Server platform 102 is responsible for deploying different applications 104-1, 104-2, and 104-3 to different devices 106-1, 106-2, and 106-3. Each application 104-1, 104-2, and 104-3 represents a different version of the same application that has been programmed to operate and execute specifically on a corresponding device 106-1, 106-2, and 106-3. As shown by FIG. 1, each device requires its own corresponding application to be served to it. For example, application 104-1 corresponds to device 106-1, application 104-2 corresponds to device 106-2, and application 104-3 corresponds to device 106-3. Thus, development of applications can be inefficient, and due to time and cost constraints for developers, applications tailored for certain devices may simply not be developed due to these constraints.

Figure 2:
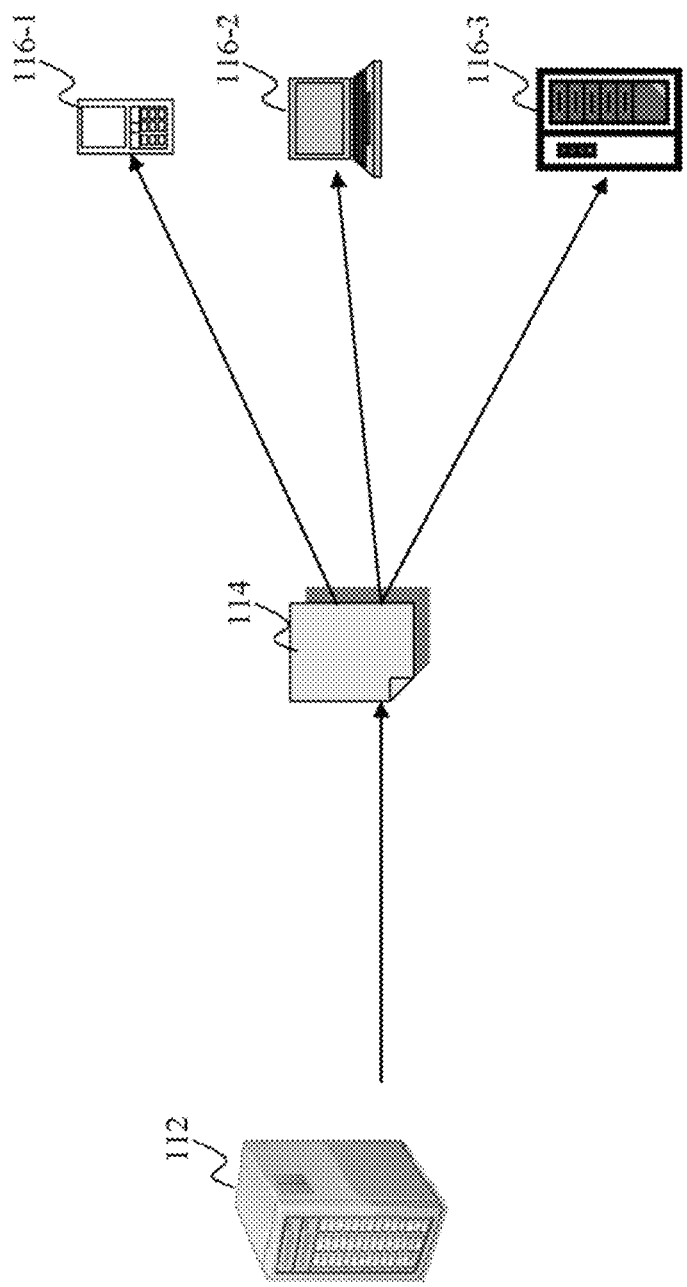
FIG. 2 depicts a system for developing and deploying a single application that is interoperable with a plurality of device platforms in accordance with an embodiment of the present disclosure.

FIG. 2 depicts a system for developing and deploying a single application that is interoperable with a plurality of device platforms in accordance with an embodiment of the present disclosure. Development and hosting platform 112, described in further detail in the paragraphs below, allows developers to develop a single application 114, that may be deployed to different devices 116-1, 116-2, and 116-3. Application 114 is written in a fashion that allows application 114 to be interoperable between different devices. Thus, developers only need to develop the application once and serve it across a network to any number of devices running any type of operating system.

Figure 3:
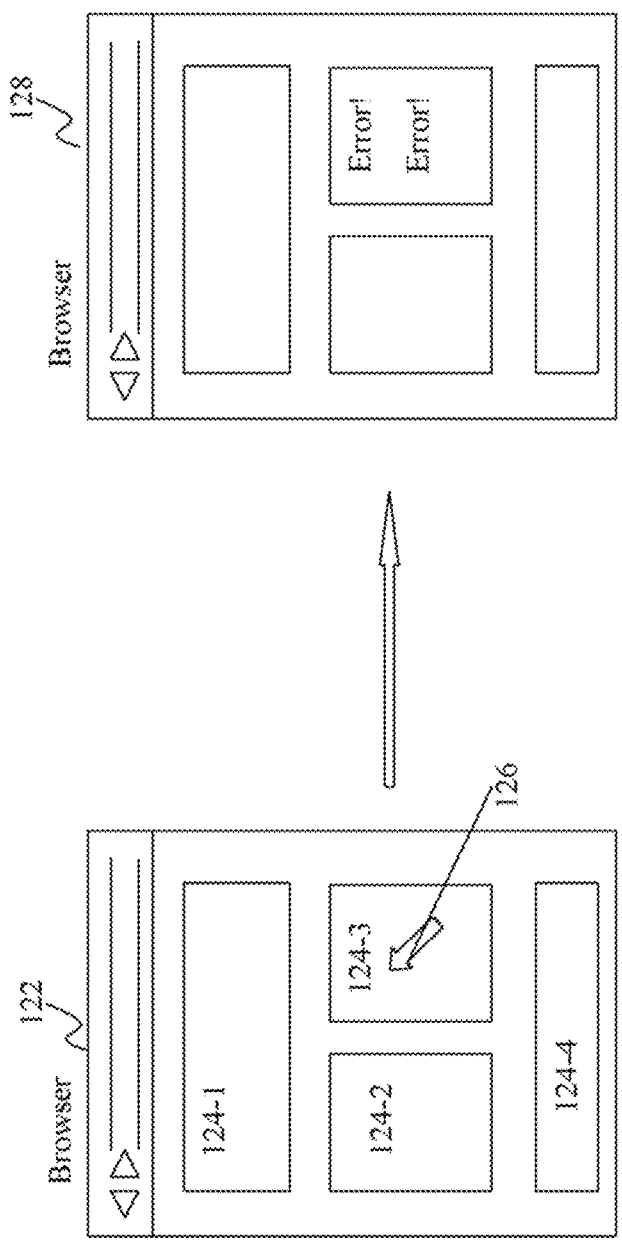
FIG. 3 depicts an exemplary prior art browser interaction.

FIG. 3 depicts an exemplary prior art browser interaction. In FIG. 3, browser 122 displays an application having four view screens 124-1-4. Each view screen represents a part of the application that is either viewable and/or actionable in response to user input. Cursor 126, shown in view screen 124-3 may be clicked or activated by a user. If activation of cursor 126 in view screen 124-3 requests a result from the application that browser 122 cannot execute, view screen 124-3 of browser 122 will show an error state, which is shown by browser 128 of FIG. 3. In certain circumstances, the entire application may crash or cease to operate, simply because a user may have attempted to execute an action in a view screen of the application that is not supported by either the operating system or the device in which the browser resides. For example, if clicking in view screen 124-3 represented an attempt to start a JavaScript application, and the browser, operating system, or device does not support JavaScript, then an error will result, such as that shown in browser 128. Thus, a user is unable to complete their task or use the application to its full capacity.

Figure 4:
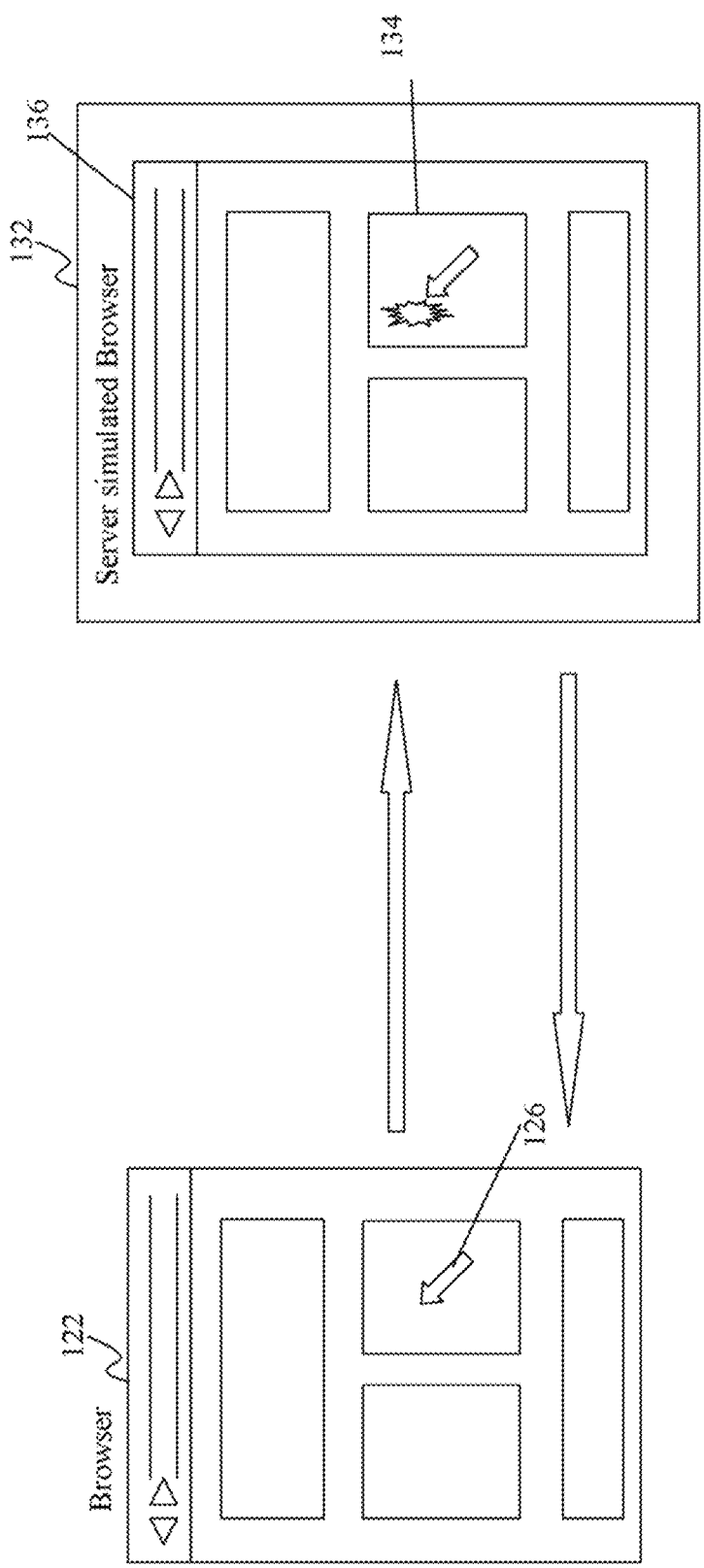
FIG. 4 depicts an exemplary result of a browser interaction with a server browser executing an application in accordance with an embodiment of the present disclosure.

FIG. 4 depicts an exemplary result of a browser interaction with a simulated server browser executing an application in accordance with an embodiment of the present disclosure. Browser 122 is the same as the one shown in FIG. 3, except in this instance, browser 122 is executing an application that has been developed to be interoperable between different device platforms and operating systems, in accordance with the embodiments of the present disclosure. The main difference depicted by FIG. 4 is the result of a user interacting with cursor 126. When a user activates cursor 126, even if browser 122 is unable to produce a response due to incompatibility or a problem with its operating system or device, browser 122 is able to send the user instruction representing an activation of cursor 126 to server 132. Server 132 may host or run a hosted version of the same application, and carry out the user instruction, as shown in view screen 134 of simulated browser 136. The result of the user instruction may be transmitted back to browser 122 and shown within the corresponding view screen of browser 122. Thus, even if browser 122 itself, or its operating system or device, is incapable of producing a response to the user interaction with cursor 126, browser 122 may contact server 132 to produce the desired result. Server 132 may transmit a view screen showing the exact results to browser 122 so a user of browser 122 can continue using the application without realizing that the application may have suffered from compatibility issues when executed at a client browser.

Figure 5:
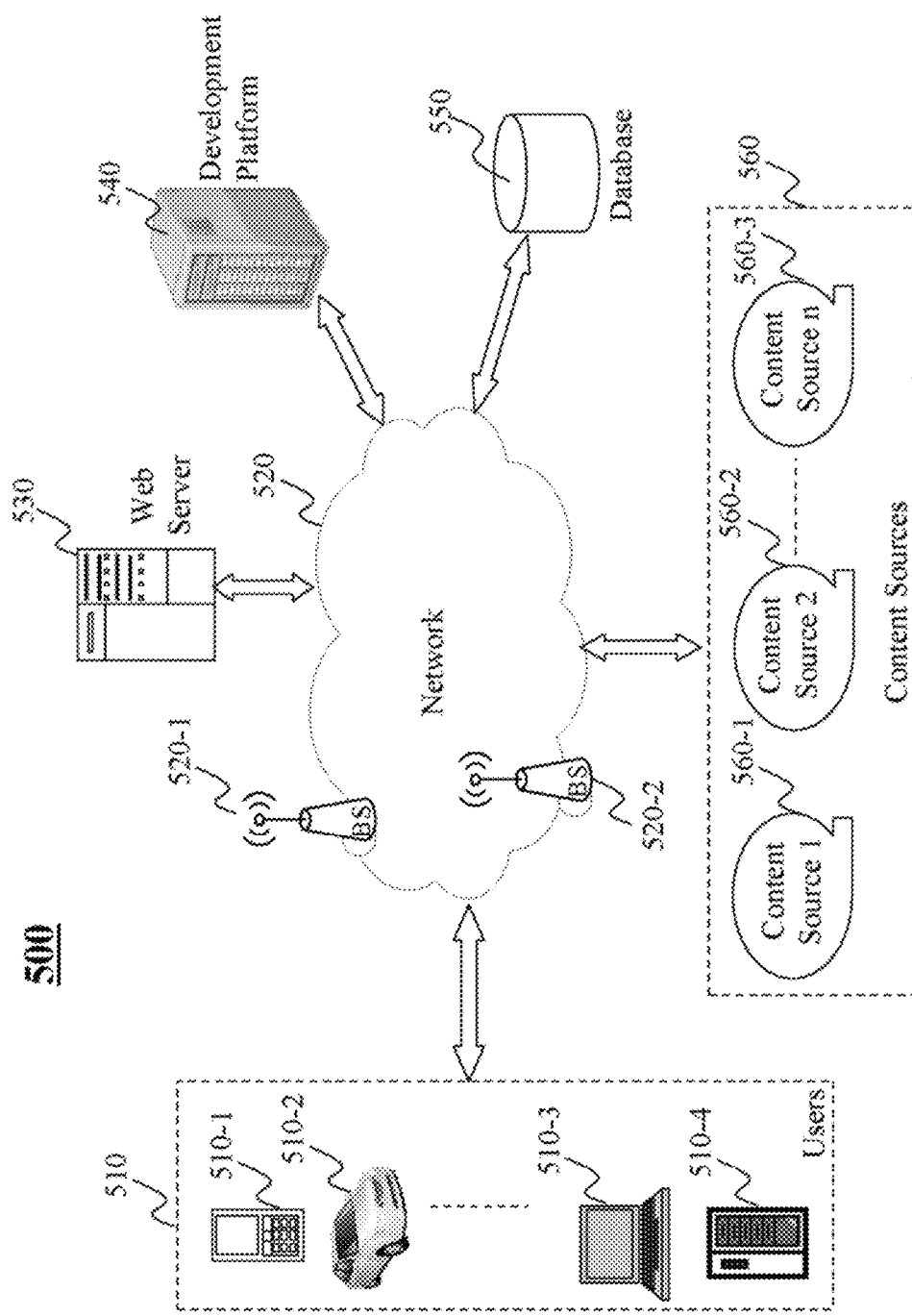
FIG. 5 is a high level depiction of an exemplary system 500 in which a development platform is deployed to provide development and hosting of applications that are interoperable between different device platforms and operating systems.

FIG. 5 is a high level depiction of an exemplary system 500 in which a development platform is deployed to provide development and hosting of applications that are interoperable between different device platforms and operating systems, in accordance with an embodiment of the present disclosure. Exemplary system 500 includes users 510, network 520, web server 530, content sources 560, development platform 540, and a database 550. Network 520 can be a single network or a combination of different networks. For example, a network may be a local area network (LAN), a wide area network (WAN), a public network, a private network, a proprietary network, a Public Telephone Switched Network (PTSN), the Internet, a wireless network, a virtual network, or any combination thereof. A network may also include various network access points, e.g., wired or wireless access points such as base stations or Internet exchange points 520-1, . . . , 520-2, through which a data source may connect to in order to transmit information via the network.

Users 510 may be of different types such as users connected to the network via desktop connections (510-4), users connecting to the network via wireless connections such as through a laptop (510-3), a handheld device (510-1), or a built-in device in a motor vehicle (510-2). A user may run applications provided by web server 530, development platform 540, or any of content sources 560. Thus, applications may be provided from web server 530, development platform 540, or any of content sources 560 through network 520. Once a user is running an application on their device, user may send instructions or requests via the application to web server 530, development platform 540, or any of content sources 560 through network 520. The application may also independently communicate with web server 530, development platform 540, or any of content sources 560 through network 520 as needed to ensure that the application can execute properly.

For example, an application that is interoperable across different platforms and operating systems may be provided to any of users 510 by web server 530, development platform 540, or any of content sources 560 through network 520. The application may be developed at development platform 540 but may also be deployed through any of the aforementioned components. The application may also be hosted by development platform 540 so that the entire application is executed remotely, with all results of user interactions with the application provided to the users 510.

The content sources 560 include multiple content sources 560-1, 560-2, . . . , 560-3. A content source may correspond to a web page host corresponding to an entity, whether an individual, a business, or an organization such as the USPTO represented by USPTO.gov, a content provider such as Yahoo.com, or a content feed source. It is understood that any of these content sources may store and host applications that have been developed using development platform 540 in accordance with an embodiment of the present disclosure. A content source may also include, for example, an application store that provides applications to personal computers, laptops, or mobile devices. Web server 530 and development platform 540 may access information from any of content sources 560 and rely on such information to respond to application requests and vice versa. Development platform 540 may also access additional information, via network 520, stored in database 550, which may contain modules and/or application tools for developing applications.

In exemplary system 500, an application is developed at development platform 540. The application is developed such that the application is interoperable across different device platforms and operating systems. Additionally, the application is developed such that if the application is one requiring a hybrid client device and server runtime, the application may execute on its own at a client or user device independent of the device's connection to a server over a network. The application is also developed so that it may adaptively utilize the resources of a server if a server is better suited to execute certain aspects of the application or the entire application. Finally, the application is developed so that it may be hosted completely at a server, which simply provides response to application user input to a user or client device, while the server carries out all instructions and requests received by the application via user input.

The application need only be developed once and the same application may be deployed across network 520 to any of users 510. The application may be deployed to users 510 from any of web server 530, development platform 540, or content sources 560.

In an embodiment, the application is deployed to user 510-1 using a mobile device. If, for example, user 510-1 of the mobile device enters an area of limited or no mobile broadband connectivity, the application is able to continue executing even though the application cannot establish a connection with a web server or content source from which it is deployed.

In another embodiment, the application is deployed to user 510-3 using a laptop that is incompatible with the application because the laptop is not capable of supporting JavaScript. However, development platform 540, from which the application is deployed, may host the application and carry out any requests of user 510-3 at their laptop. Development platform 540 provides user 510-3 responses to user inputs of the application that is viewable and actionable by user 510-3 so that user 510-3 does not notice any difference or suffer any consequence from their laptop being incompatible with the application.

Figure 6:
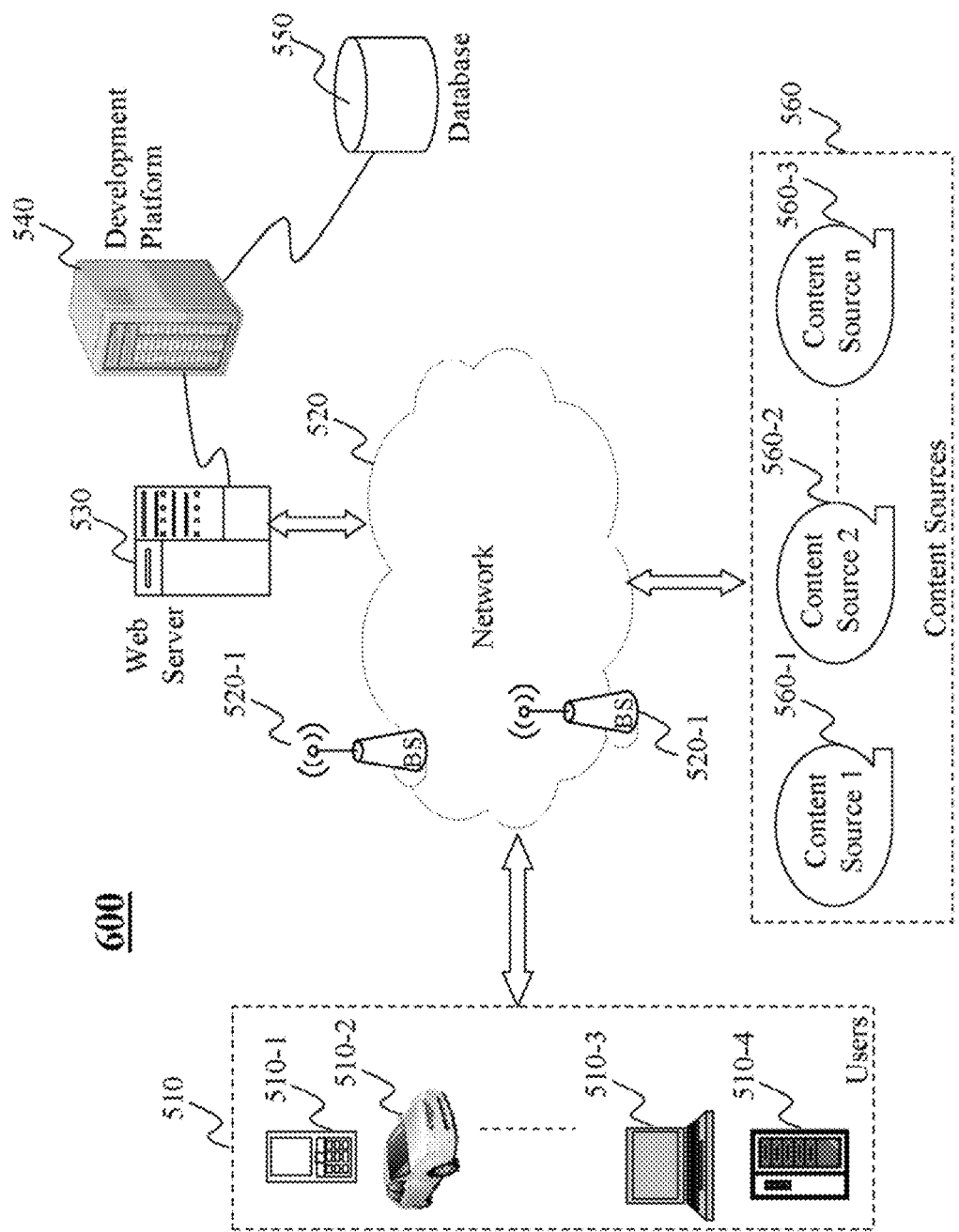
FIG. 6 is a high level depiction of an exemplary system 600 in which a development platform is deployed to provide and host applications that are interoperable between different device platforms and operating systems, in accordance with an embodiment of the present disclosure.

FIG. 6 is a high level depiction of an exemplary system 600 in which a development platform is deployed to provide development and hosting of applications that are interoperable between different device platforms and operating systems, in accordance with an embodiment of the present disclosure. In this embodiment, development platform 540 serves as a backend system of web server 530. All communication to and from development platform 540 are sent and received through web server 530.

Figure 7:
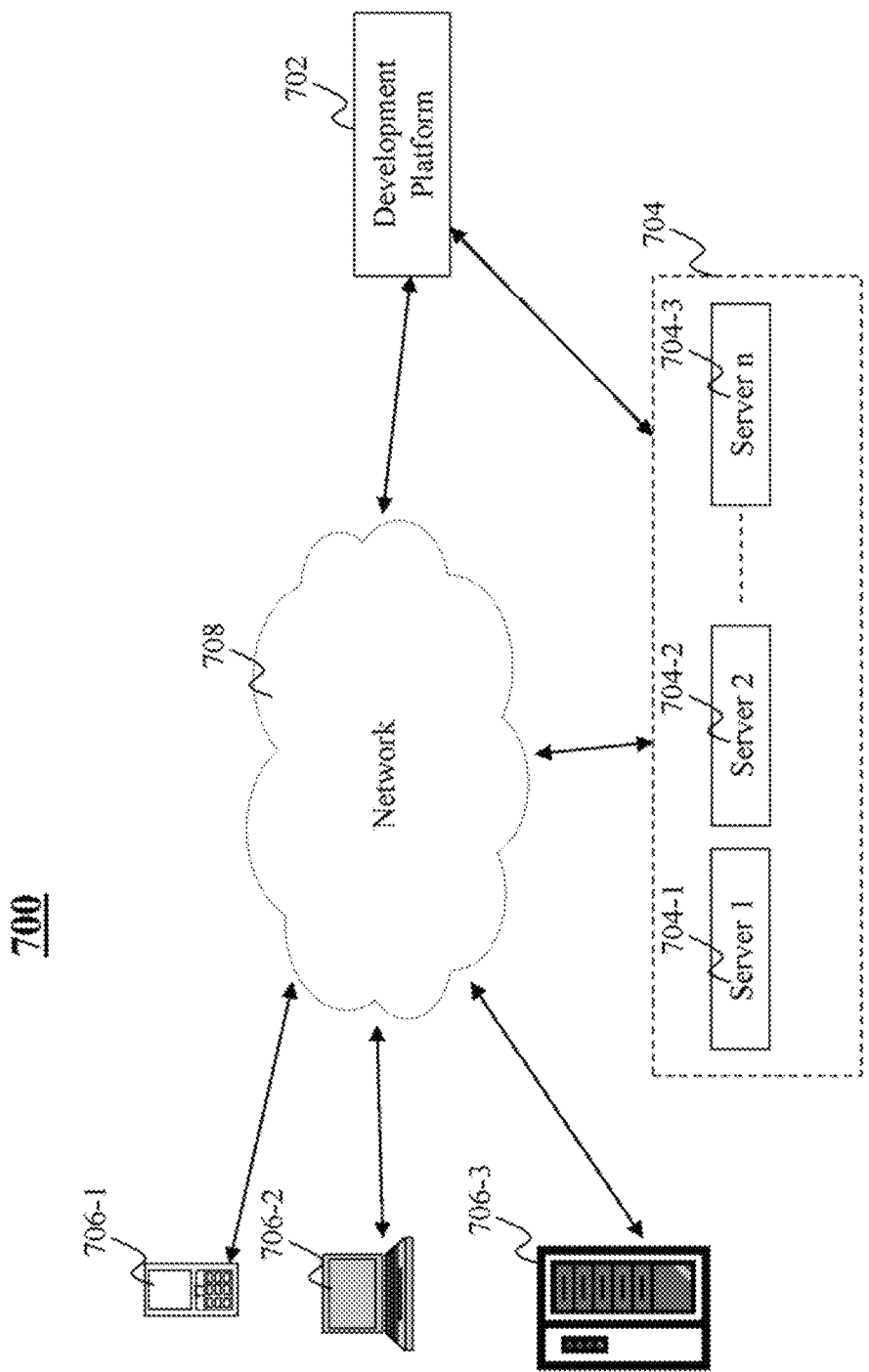
FIG. 7 is a high level depiction of an exemplary system 700 in which development platform 702 directs distributed hosting of applications, in accordance with an embodiment of the present disclosure.

FIG. 7 is a high level depiction of an exemplary system 700 in which development platform 702 directs distributed hosting of applications, in accordance with an embodiment of the present disclosure. Development platform 702 is a platform that may be used to develop applications that are interoperable across different device platforms. Applications developed by development platform 702 may be deployed to any of servers 704, which then host the applications that are eventually distributed for use by devices 706 over network 708. For example, a developer develops an application at development platform 702. The completed application is deployed to server 704-1. Server 704-1 is then responsible for deploying the application to any of devices 706 over network 708 for usage.

Figure 8:
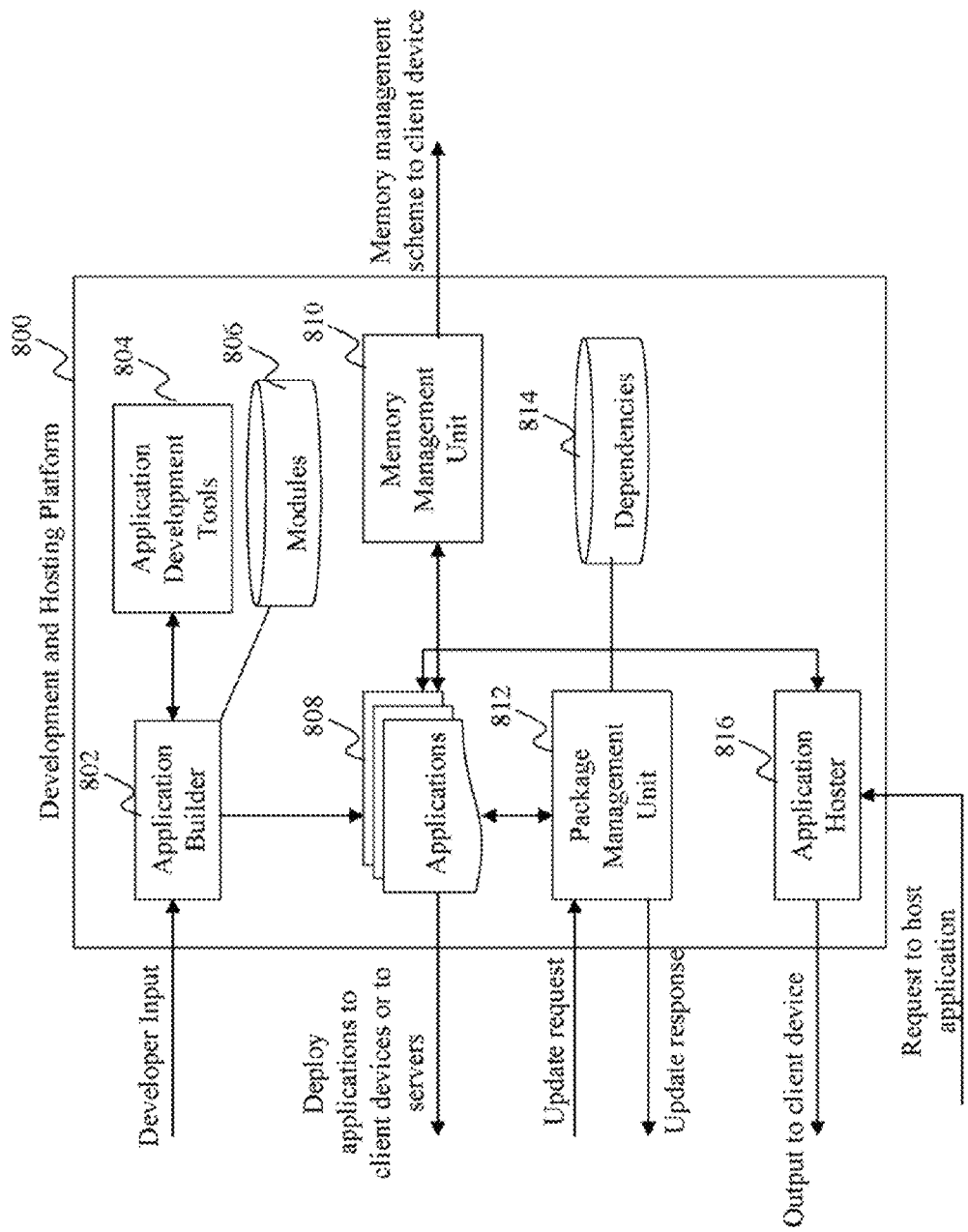
FIG. 8 is a high level depiction of an exemplary development and hosting platform in accordance with an embodiment of the present disclosure.

FIG. 8 depicts a high level depiction of an exemplary development and hosting platform in accordance with an embodiment of the present disclosure. Development and hosting platform 800 includes an application builder 802, application development tools 804, modules database 806, applications 808, memory management unit 810, package management unit 812, dependencies database 814, and application hoster 816. Application builder 802, receives developer input, and generates applications 808. Each application that is generated includes at least one module that may be retrieved from, for example, modules database 806. Application development tools 804 are used to assist in developing the applications.

All applications that are developed are based on a browser based or scripting based application framework. In an embodiment, this browser based or scripting based application framework is a JavaScript application framework. Thus, in an embodiment, the applications are written or coded completely using JavaScript. The JavaScript application framework facilitates development of applications that can be executed in both client-side and server-side environments. The JavaScript application framework ensures that developers using application builder 802 do not have to write a different set of code for a server backend and a browser frontend. The JavaScript application framework also ensures that even if a browser attempting to execute the application is not capable of running JavaScript applications or is not compatible with JavaScript, the application will adapt and execute instead at a server side. Since all applications may be JavaScript based, a single code base may be used. A module/widget application framework is also used along with the JavaScript application platform by application builder 802 to develop applications that may be deployed to devices. The application framework facilitates the development of transportable code between client devices or browsers at client devices and server. The application framework provides a software architecture pattern that isolates application logic for a user from a user interface, thus permitting independent development, testing, and maintenance of each.

Thus, as discussed above, each application generated by application builder 802 allows developers to develop one application that is interoperable between different device platforms and operating systems. The same single application may be deployed to a variety of devices and be executable on all of them. The applications may be deployed to any device that is capable of running or having a browser environment capable of executing the applications.

Application development tools 804 facilitate continuous integration of tasks for developers using application builder 802 to develop applications. The development of applications may be monitored, and output from the applications reviewed. Application development tools 804 may also be used in conjunction with application builder 802 to add device specific presentation capabilities to applications.

Memory management unit 810 may be used to add yet another level of functionality to the applications developed by application builder 802. Before, or after deployment of an application to a device, memory management unit 810 may detect a current or expected memory usage of the device. If the application will require more memory than is available at the device, memory management unit 810 may deploy a memory management scheme to the device. The memory management scheme ensures that the device will always have enough memory to support execution of the application. This prevents the application from encountering memory related errors.

Package management unit 812 is responsible for ensuring that deployed applications are kept updated. Deployed applications may periodically or at user request, submit an update request to package management unit 812 to serve updated packages to the applications. The update request includes a list of currently installed and additional packages it wants to acquire. Package management unit 812 checks the package list and obtains package dependencies from dependencies database 814. Package dependencies ensure that the client device receives not only the packages it requests, but also additional, and dependent packages that should be served to ensure that the application is fully upgraded and able to operate. Package management unit 812 is then able to deploy or serve all updated and required packages to the client device autonomously.

Package management unit 812 may also be responsible for ensuring that the correct packages are delivered to a client device based on the client device type. For example, if a client device is a smartphone operating on iOS, package management unit 812, ensures that the packages received by the client device are compliant with iOS and are optimized such that the application will execute taking full advantage of the capabilities of the client device.

In another embodiment, package management unit 812 may facilitate retrieval of partial previews of compatible remote packages not currently installed on the client device. Partial previews provide a preview mode for "try before you buy" scenarios which may apply to up-to-date and older version of applications. Compatibly previews may be adaptively served by package management unit 812 based on a current version of an application executing on a client device.

For example, if a client device is running an older version of an application, the server may need to determine a more appropriate package corresponding to an older version of the application. The client device may submit a request to package management unit 812 for packages it wishes to preview. Package management unit 812 determines the client device is executing an older version of an application and searches for files which have been tagged to represent their association with a particular version of the application. Once package management unit 812 finds the appropriate files, it responds to the client device with the location of the files so that the client device may retrieve them.

In another embodiment, package management unit 812 facilitates server side caching. Server side caching involves package management unit 812 making an independent determination of which packages are required at a client device. This allows package management unit 812 to adaptively cache certain packages to ensure that required packages are deployed in an efficient manner to prevent any slow down of package installation and updates. Intermediate computations may be cached to aid future package requests.

In another embodiment, package management unit 812 performs a determination of a minimal set of packages required in order to update an application at the client device. This minimal set of packages represents only the packages that are not present at the application but are required. This ensures that when a client device sends a list of packages to the package management unit 812, package management unit 812 will perform an independent determination to determine the minimal set of packages, representing a barebones set of packages necessary to update the application at the client device. Thus, this facilitates an efficient usage of resources and ensures that the application will not be bogged down by receiving too many unnecessary updates at once.

In another embodiment, package management unit 812 may send instructions to a client device to delete, remove, or clean up packages residing on the client device related to the application that are no longer needed. Package management unit 812 may also prepare updates to the client device based on a set of transactions defined by package management unit 812, with instructions allowing the client device to implement a rollback feature in cases where updated packages fail or do not operate as expected on the client device.

Application hoster 816 is a hosting environment for all applications developed by application builder 802. More specifically, application hoster 816 is a server-side JavaScript hosting environment for applications, allowing application developers to deploy, un-deploy, and manage multiple versions of applications. Applications deployed from application hoster 816 are able to be executed on any device platform due to the platform agnostic nature of the applications. Application hoster 816 provides hosting of applications in a network environment. Thus, the servers shown in FIG. 7 are not necessary for hosting developer created applications.

Figure 9:
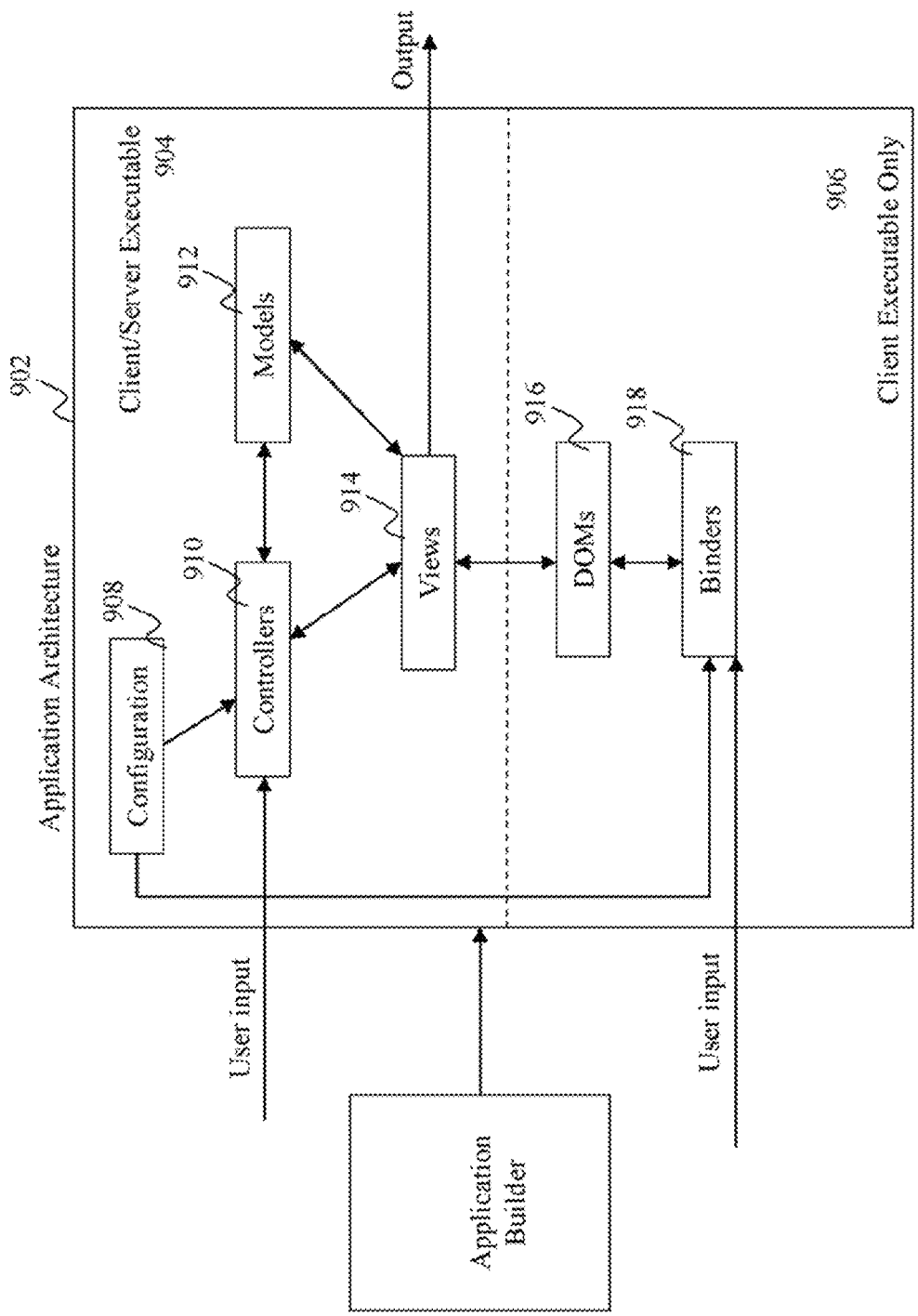
FIG. 9 depicts an exemplary application architecture in accordance with an embodiment of the present disclosure.

FIG. 9 depicts an exemplary application architecture in accordance with an embodiment of the present disclosure. Application architecture 902 represents the application framework used by application builder 802 to develop applications. Since applications developed using application builder 802 may be written completely in a browser oriented language or a scripting language. For example, the language may be JavaScript. It follows that both client components and server components of any application developed using application builder 802 are written in JavaScript as well. This facilitates the execution of applications on both a client device or browser at a client device, or at a server. FIG. 9 depicts elements of an application architecture 902 and corresponding components.

Application architecture 902 includes client/server executable components 904 and client executable components 906. Client/server executable components 904 include configuration files 908, controllers 910, models 912, and views 914. Client executable components 906 includes document object models (DOMs) 916 and binders 918.

Configuration files 908 define relationships between code components, assets, routing paths, and defaults. When an application is first created by a developer using application builder 802, configuration files are generated. Controllers 910 react to user input and initiate responses to user input by calling models 912. For example, a particular controller associated with a particular model may receive an indication of a user input and instruct a corresponding model and corresponding view from views 914 to perform actions based on the user input. Models 912 manage the behavior and data of an application domain, and responds to requests for information about its state (from the views), and responds to instructions to change state (from the controllers). More specifically, models 912 notify views 914 about changes in information so that views 914 can react accordingly. Views 914 renders models 912 into forms suitable for interaction, typically in the form of a user interface element. Multiple views may exist for a single model. Views 914 represent what a user of an application sees on a device or browser.

For an application operating at a server side or within a browser at a client device, client requests for data, or user input, is sent to controllers 910, which fetch data from models 912 to pass to views 914. The appropriate output from the views may then be passed back to the client device.

DOMs 916 assist in rendering views DOMs 916 are object models that represent objects irrespective of view. DOMs 916 and binders 918 are deployed to a client device only since they are only executable at a client device. Binders 918 interact with event handlers based on user interface input to an application from a user. The event handlers interact with the DOMs 916 which in turn invoke functions in the controllers 910 to update content in views 914. Since DOMs 916 and binders 918 are only client executable, binders receive user input in the form of user interface interactions. The binders 918 interact with the DOMs 916, which communicates with the controllers to facilitate client requests.

The user input to controllers 910 at a server side occurs when client device binders 918 are not executable. This causes controllers 910 at a server side to run remote network requests that are sent to models 912. The results from models 912 are sent to views 914 to transmit back to the client device for rendering at a client browser.

Figure 10:
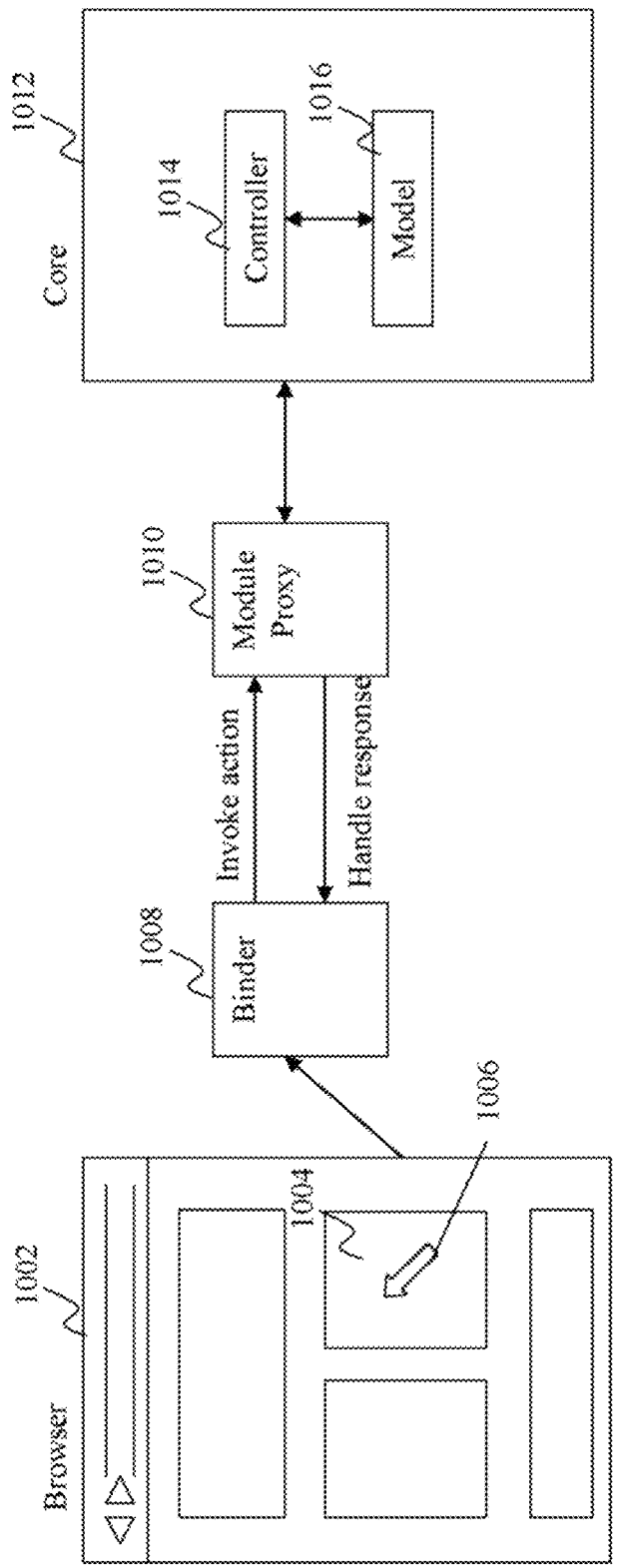
FIG. 10 depicts an exemplary client-side application execution in accordance with an embodiment of the present disclosure.

FIG. 10 depicts an exemplary client-side application execution in accordance with an embodiment of the present disclosure. Browser 1002 represents a client side browser instance running an application in accordance with the embodiments described herein. Upon activation or clicking of view panel 1004 using cursor 1006, an instruction bound to binder 1008 invoke an action corresponding with view panel 1004. The instruction is sent through module proxy 1010, which serves as a conduit for sending requests to Core 1012 of the application. The instruction is transmitted through module proxy 1010 to controller 1014, which executes the instruction at the client side browser based on sending a request for information to model 1016. The response to execution of the instruction at controller 1014 is transmitted through module proxy 1010, back to binder 1008, which interacts with view panel 1004 that will show the appropriate response.

Figure 11:
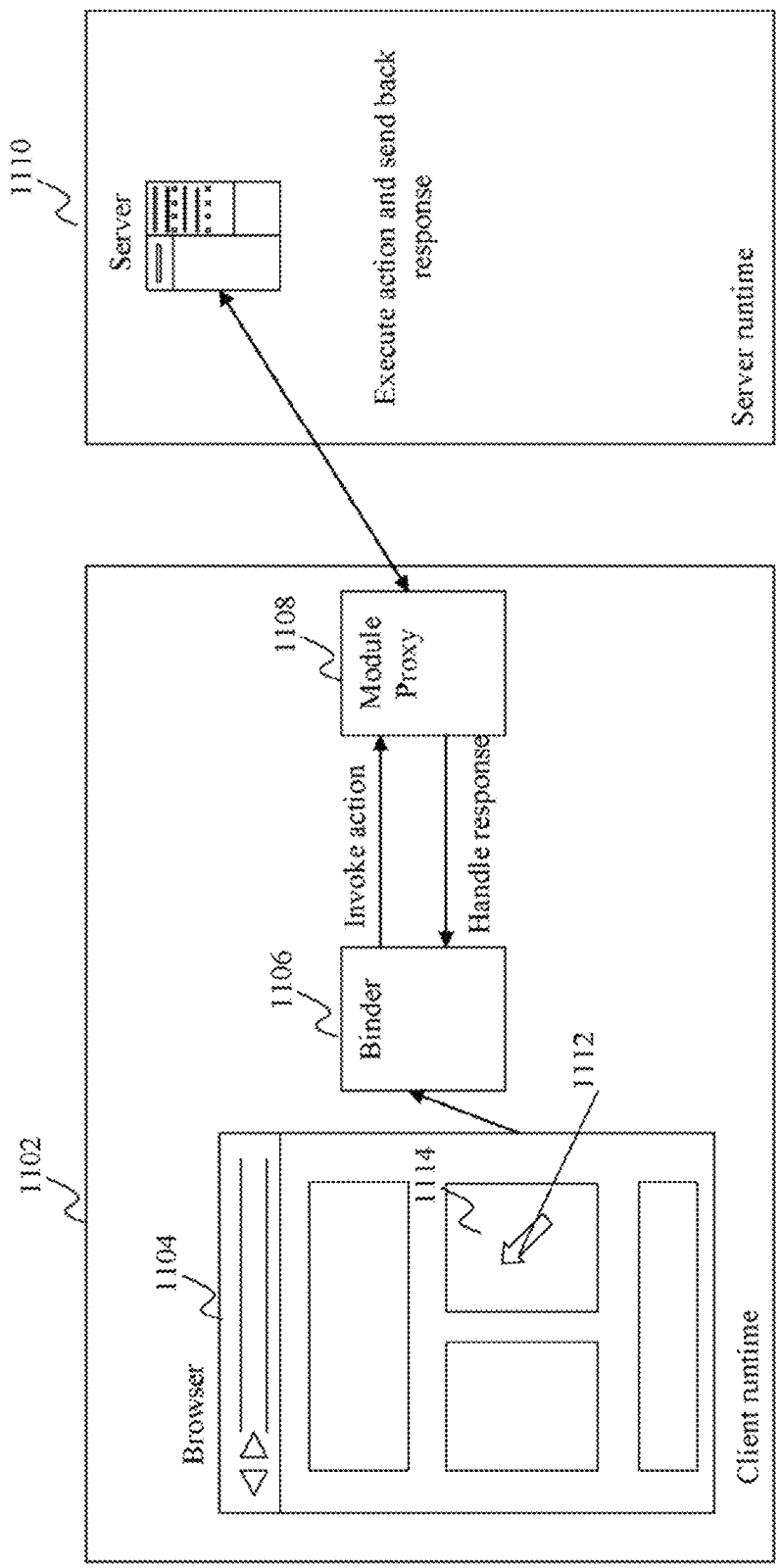
FIG. 11 depicts an exemplary server-side application execution in accordance with an embodiment of the present disclosure.

FIG. 11 depicts an exemplary server-side application execution in accordance with an embodiment of the present disclosure. Client runtime box 1102 shows all interactions between browser 1104, binder 1106, and module proxy 1108 with respect to a client-side execution of an application. Server runtime box 1110 shows a server responding to instructions sent from module proxy 1108. In this particular example, a certain user input interaction based on cursor 1112 in view panel 1114 is unable to be executed at the client side. Thus, an instruction representing the user input interaction is bound to binder 1106. An action is invoked by binder 1106, which sends the instruction through module proxy 1108, which serves as a conduit for sending requests to different servers that may be hosting or executing the application. Server 1116 receives the instruction, executes the action at the application executing at the server side and transmits a response back through module proxy 1108 to binder 1106, which interacts with view panel 1114 to show the appropriate response to the user input interaction or instruction.

Figure 12:
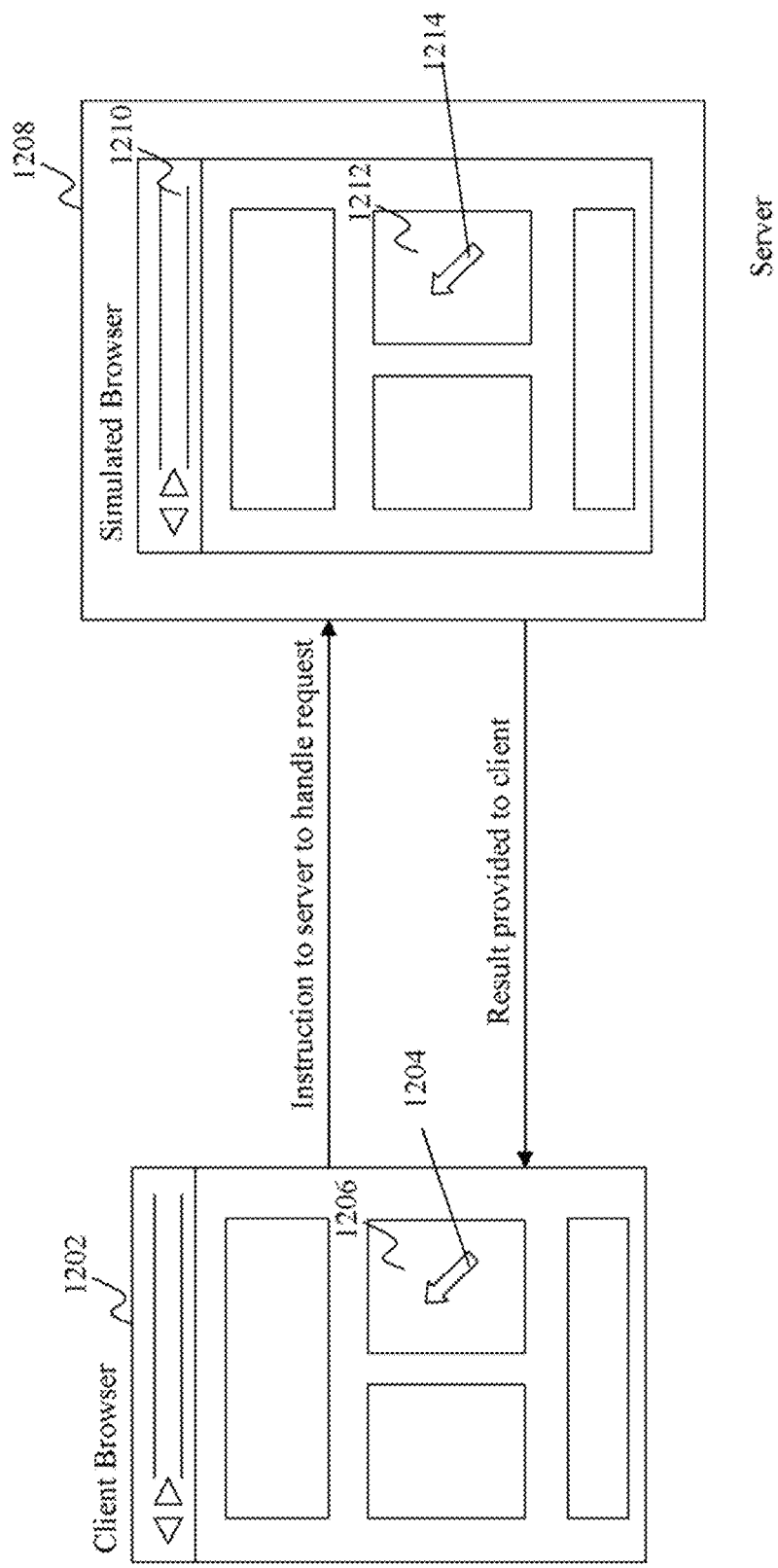
FIG. 12 depicts an exemplary view of a client browser running an application at a client, and a simulated browser at a server running the same application, in accordance with an embodiment of the present disclosure.

FIG. 12 depicts an exemplary view of a client browser running an application at a client, and a simulated browser at a server running the same application, in accordance with an embodiment of the present disclosure. Client browser 1202 includes a cursor 1204 for receiving user input to a view panel 1206. Since client browser 1202 cannot execute an instruction related to the user input, the instruction is sent to server 1208. Server 1208, which is executing the same application at a server side will execute the instruction sent by the client browser 1202 and provide a response that is viewable within view panel 1206 of client browser 1202. The simulated browser 1210 includes a view panel 1212, as well as simulated cursor 1214 which corresponds to the activities happening at client browser 1202.

Figure 13:
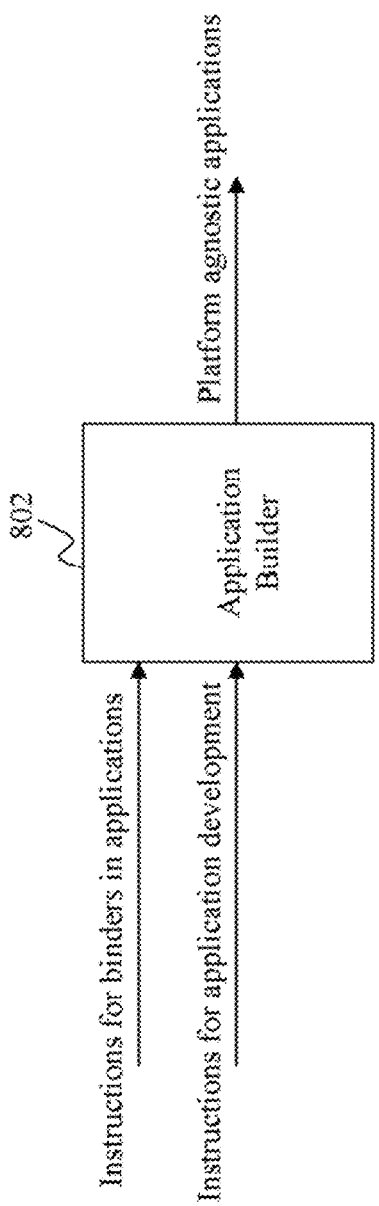
FIG. 13 depicts an exemplary high level system diagram of application builder 802, in accordance with an embodiment of the present disclosure.

FIG. 13 depicts an exemplary high level system diagram of application builder 802, in accordance with an embodiment of the present disclosure. Application builder 802, which is responsible for developing and generating platform independent applications, receives instructions for application development, including application parameters, and modules to include in the application. Application builder 802 also receives instructions for adding binders to the application. Binders, as discussed above, are set by an application developer. The binders dictate which event handlers (tied to user interface inputs) may attach with DOMs that further communicate within the architecture of the application. Taking all of the input into account, as well as using application development tools 804, platform agnostic applications are output from application builder 802. These applications may then be deployed to directly to a client device, deployed for serving through a different server, such as, for example, one linked or associated with a mobile application store, or deployed to application hoster 816 for hosting through a cloud based network.

Figure 14:
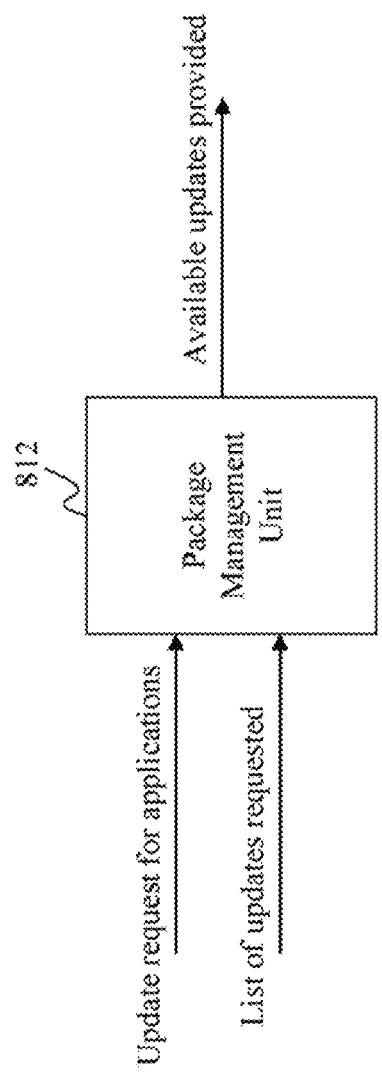
FIG. 14 depicts an exemplary high level system diagram of package management unit 812, in accordance with an embodiment of the present disclosure.

FIG. 14 depicts an exemplary high level system diagram of package management unit 812, in accordance with an embodiment of the present disclosure. Package management unit 812 is responsible for providing updates to applications in the form of packages to keep deployed applications updated. Package management unit 812 receives as input, lists of required packages and currently installed packages. Package management 812 then uses this received input to cross reference a dependencies database to determine what other packages may be required in addition to those required for the requested updates. Once the entire package list is determined by package management unit 812, the updates in the form of packages are deployed to the applications. This ensures that applications will to the extent possible reflect the latest version.

In an embodiment, a large set of packages may be a part of a predefined grouping which may be referenced with a small amount of information. For example, a list of required packages may simply reference a predefined grouping of packages as opposed to each package piecemeal.

In another embodiment, package management unit 812 may receive an update request for a past version of an application. In this scenario, package management unit searches for a corresponding past update package that is compatible with the update request, and provides the relevant packages to the application as required.

Figure 15:
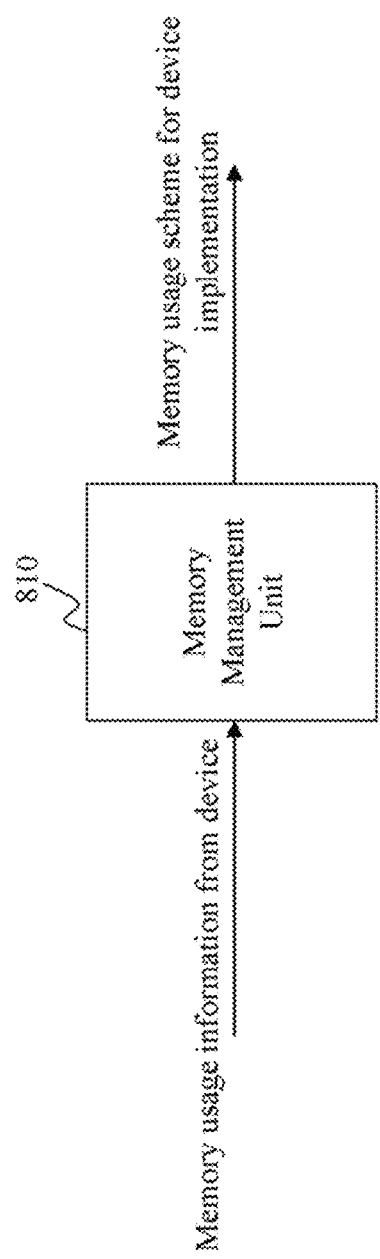
FIG. 15 depicts an exemplary high level system diagram of memory management unit 810, in accordance with an embodiment of the present disclosure.

FIG. 15 depicts an exemplary high level system diagram of memory management unit 810, in accordance with an embodiment of the present disclosure. Memory management unit 810 receives as input, memory usage information from a device that an application has been deployed or transmitted to. Prior to execution of the application at the device, memory management unit 810 receives memory usage information and analyzes the memory usage information. If the memory usage information shows that the device does not have enough free memory to execute the application, memory management unit determines a memory usage scheme for the device to ensure that the application may be executed. The memory usage scheme is then transmitted to the device by memory management unit 810 for implementation at the device.

Figure 16:
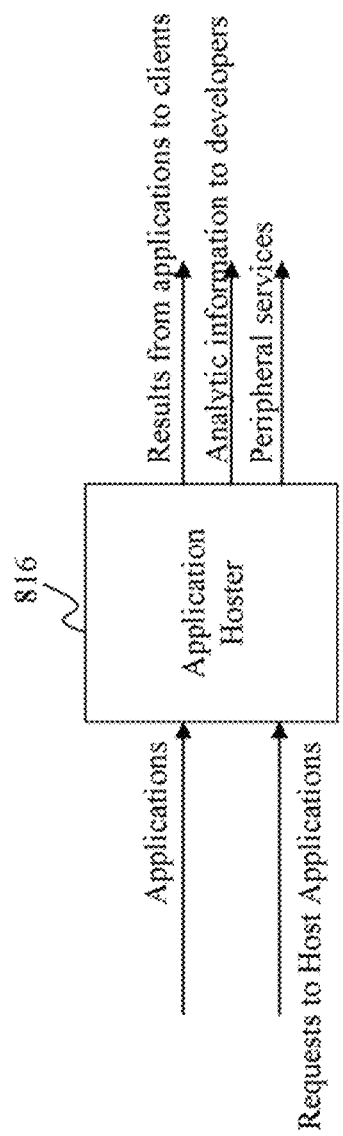
FIG. 16 depicts an exemplary high level system diagram of application hoster 816, in accordance with an embodiment of the present disclosure.

FIG. 16 depicts an exemplary high level system diagram of application hoster 816, in accordance with an embodiment of the present disclosure. Application hoster 816 receives applications developed by application builder 802. Application hoster 816 can then host these applications and deploy them as necessary, while acting as a server for the applications. Application hoster 816 may also receive requests from client devices or other sources, such as developers to host applications. Application hoster 816, while hosting applications, can provide results of executing instructions provided to the hosted applications, to client devices. Also, as will be discussed in further detail below, application hoster 816 can analyze analytic information relating to deployment and execution of applications. This information may be provided to developers to assist developers in determining how to further develop applications and tweak existing applications. Since application hoster 816 is a hosting platform that hosts applications developed using application builder 802 in a cloud based environment, application hoster 816 may also host peripheral services, such as privacy controls and parental controls. These peripheral services may be deployed with any of the applications hosted by application hoster 816.

Figure 17A:
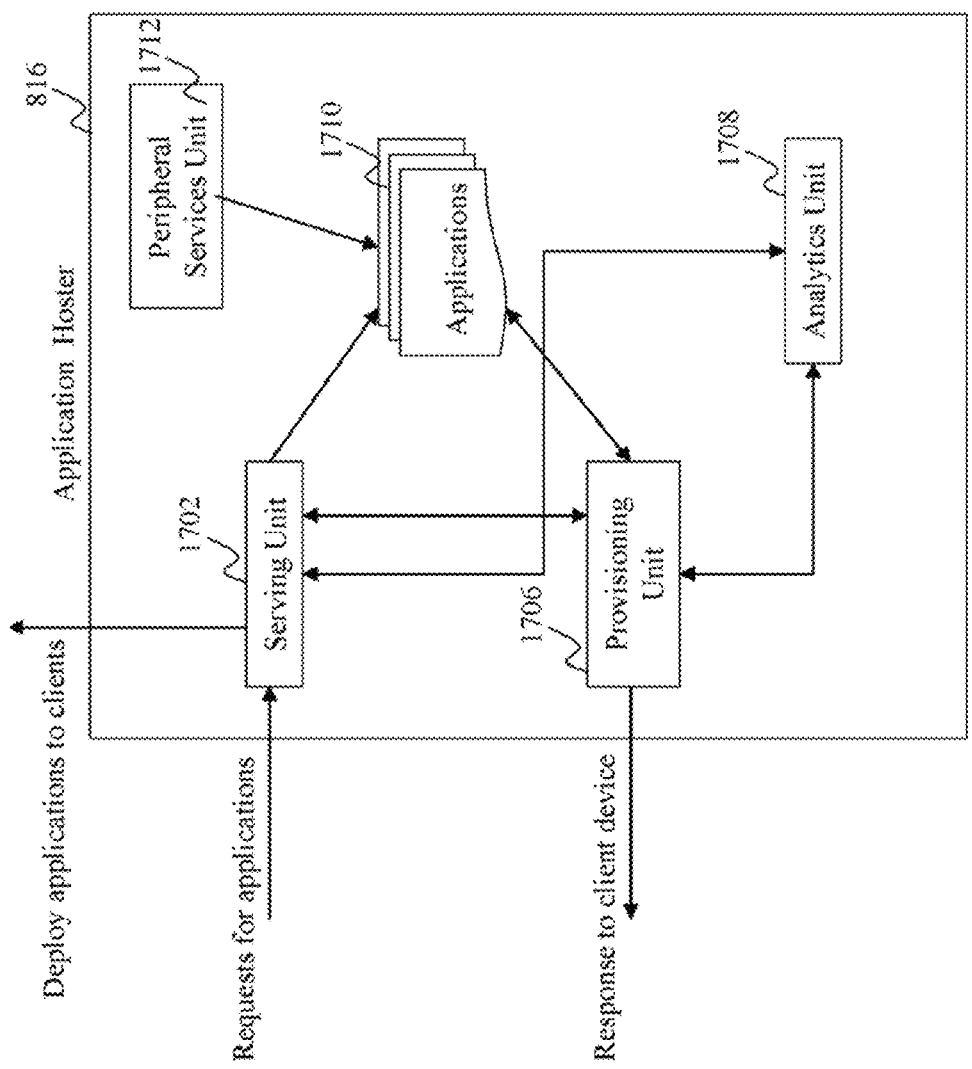
FIG. 17A depicts an exemplary high level system diagram of application hoster 816, in accordance with an embodiment of the present disclosure.
Figure 17B:
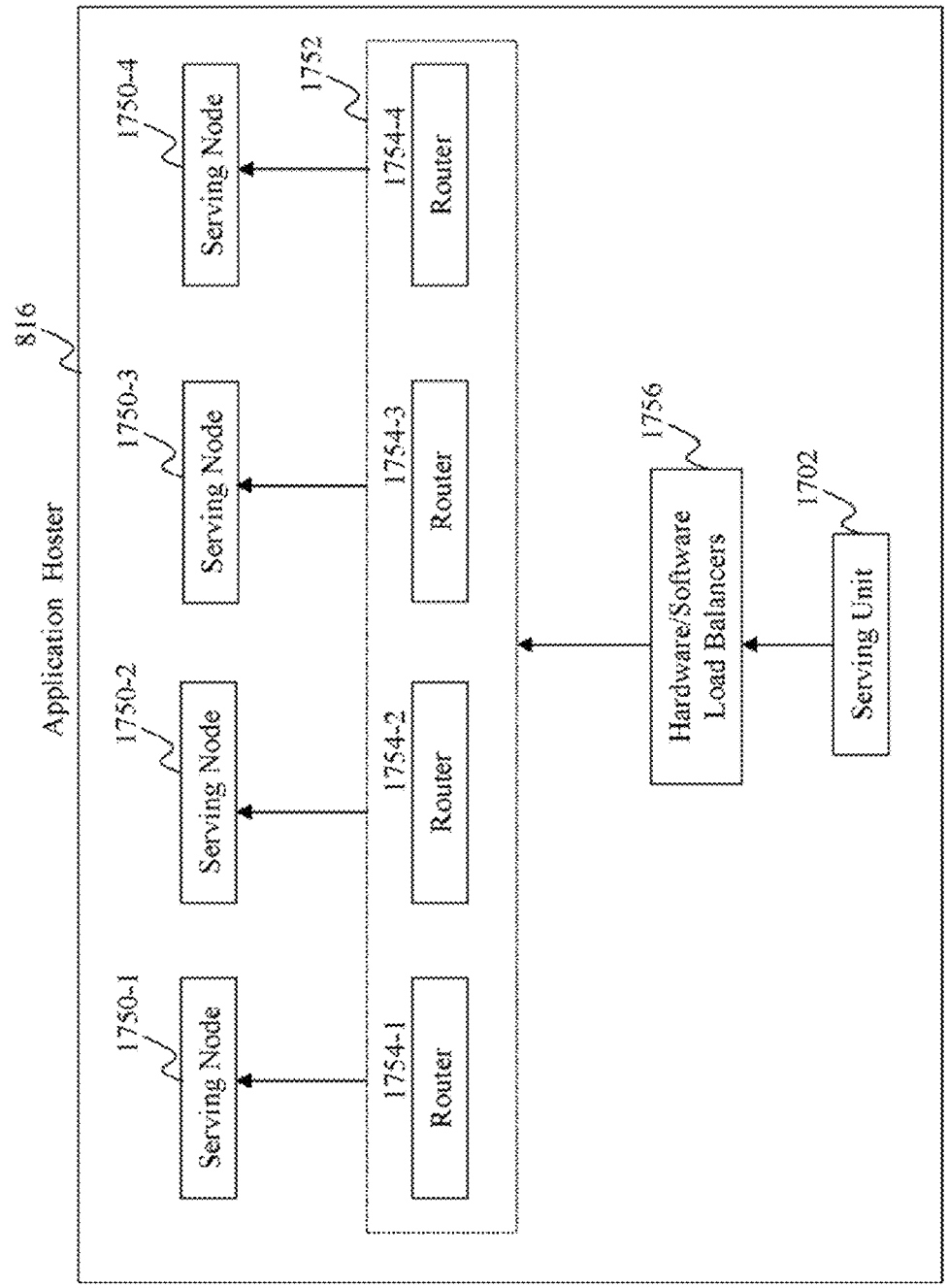
FIG. 17B depicts an exemplary high level system diagram of application hoster 816, in accordance with an embodiment of the present disclosure.

FIGS. 17A and 17B each depicts an exemplary high level system diagram of application hoster 816, in accordance with an embodiment of the present disclosure. Application hoster 816 includes serving unit 1702, provisioning unit 1706, analytics unit 1708, applications 1710, and peripheral services unit 1712. Serving unit 1702 receives requests for applications that have been deployed by application hoster 816. Any requests for applications or to perform particular instructions at a particular application are processed by serving unit 1702 which routes the requests appropriately.

Provisioning unit 1706 is responsible for deploying the correct version of applications to client devices, and for transmitting responses to client devices based on instructions received. Since multiple versions of applications exist and may be stored by application hoster 816 (i.e. development application, test application, staging application), application hoster 816 allows developers to deploy different applications that may be hosted, for example, on a distributed network of servers. The distributed network of servers may comprise multiple routers fronted by a hardware load balancer to publish changes to applications as they occur.

FIG. 17B shows in greater detail, the architecture of application hoster 816 which allows distribution on a distributed network. Application hoster 816, as shown, includes serving unit or deployment unit 1702, described in greater detail below. Serving unit or deployment unit 1702 deploys applications to web container/runtimes on multiple serving nodes 1750-1, 1750-2, 1750-3, and 1750-4. While four serving nodes are shown, any number of serving nodes may be used in accordance with an embodiment of the present disclosure. Serving nodes 1750-1, 1750-2, 1750-3, and 1750-4 are front ended by a shared routing layer 1752, which includes routers 1754-1, 1754-2, 1754-3, and 1754-4, and hardware/software load balancers 1756. While four routers are shown, any number of routers may be used in accordance with an embodiment of the present disclosure. Hardware/software load balancers 1756 receive deployed applications from serving unit 1702 and are responsible for statically distributing an even load to routers of shared routing layer 1752. Shared routing layer 1752 includes routers which serve as reverse proxies. Shared routing layer 1752 may be dynamically updated with additional applications that are provisioned by application hoster 816. Shared routing layer 1752 is responsible for routing applications to the runtimes of the serving nodes, which eventually execute the applications.

Provisioning unit 1706 may, before, during, or after deployment of an application, determine an initial resource budget for a plurality of instances of the application. The plurality of instances of the application represent individual instances of the application that may be executing at application hoster 816. This ensures that there is always an application executing such that if a client device cannot execute certain functions of the application, application hoster 816 will have an instance running to ensure a seamless transition as the client device notifies application hoster 816 of a need for application hoster 816 to execute a portion of the application or the complete application. The initial resource budget for the application is a part of a total resource pool of application hoster 816. The total resource pool of application hoster 816 represents the total amount of resources available by application hoster 816 to host and deploy all applications that it is responsible for hosting.

When provisioning unit 1706 determines that an application should be deployed, provisioning unit will select at least one of the plurality of instances for deployment based on the initial resource budget. As the initial resource budget is spread across the plurality of instances, based on resource need and demand for the application, the initial resource budget may be reallocated. Reallocation may take place when, for example, an application experiences a decrease or an increase in usage, thus necessitating either fewer or greater resources to continue to efficiently host the application.

In other circumstances, provisioning unit 1706 may determine an optimal resource budget for allocation to a certain selection of instances of the application for deployment. After application hosting has begun, it may become apparent that certain instances require more or less resources. Thus, an optimal resource budget tailored to the selected instances may be determined to ensure that all resources of provisioning unit 1706 and application hoster 816 are being utilized efficiently.

Based on the provisioning, serving or deployment unit 1702 will deploy the application to a client device. The application, which is interoperable across different device platforms, is executable by both the client device and the server or application hoster 816 which is hosting the application. Deployment may comprise assigning a plurality of routers 1714 to route requests to and from the deployed application. Requests are received from client devices executing the application, in accordance with the embodiments described herein.

The routers may be assigned to host the instances of the applications. As the routers are hosting the applications, they receive the requests from the client devices. In the event that upgrades to the applications are necessary, serving unit 1702 will instruct routers 1714 to deploy incremental upgrades to the plurality of routers on a rolling basis. This allows at least a few instances of the application to continue executing thus preventing stoppage of the application and ensuring that client devices may still access instances of the application at application hoster 816. Serving unit 702 may also generate a transition plan when upgrades are taking place to shift traffic. As routers 1754 are reverse proxies and are responsible for routing traffic to serving nodes 1750 that host the applications, the routers 1754 play an important roll when deploying rolling upgrades. If a particular serving node 1750-1, for example, is out of commission or out of the rotation due to being upgrades, the routers 1754 are notified of this at routing layer 1752. Thus, the routing layer 1752 knows this and may distribute traffic in an efficient manner accordingly.

Analytics unit 1708 may extract metrics from both serving unit 1702 and provisioning unit 1706. These metrics may be packaged as a set of information and provided to developers to assist in their application development efforts. The metrics may include information regarding how the application is performing and the efficiency at which it is being served by application hoster 816.

Analytics unit 1708 may furthermore be responsible for dynamically allocating different resources of the routers to facilitate executing of the application. Analytics unit 1708 may continuously analyze the resource usage of a plurality of routers assigned to a particular application. If there is high resource usage, analytics unit 1708 may dynamically assign additional routers to the application based on determining high resource usage. Analytics unit 1708 allows application hoster 816 to implement elasticity in order to enable top down optimization of system resource utilization. The application hoster 816 may scale up or down as needed, and be elastic to the current demands of hosting applications based on the resources required.

Peripheral services unit 1712 provides peripheral services such as privacy controls and parental controls to applications deployed by application hoster 816. For example, a hosted application may also receive the benefit of a peripheral service allowing parental controls to be set for the application. If the application were not hosted at application hoster 816, this option would not be available.

Figure 18:
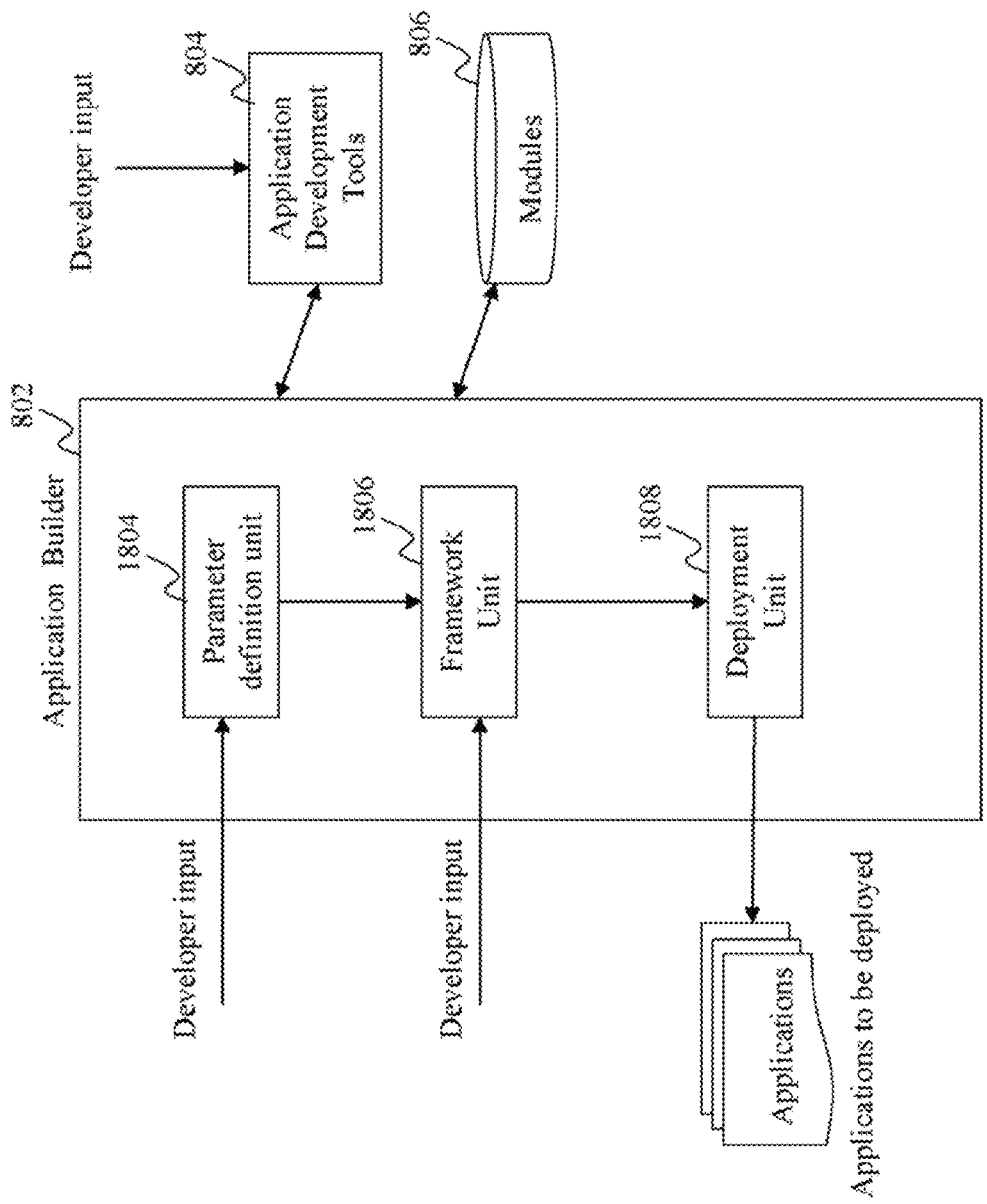
FIG. 18 depicts an exemplary high level system diagram of application builder 802, in accordance with an embodiment of the present disclosure.

FIG. 18 depicts an exemplary high level system diagram of application builder 802, in accordance with an embodiment of the present disclosure. Application builder 802 includes a parameter definition unit 1804, framework unit 1806, and deployment unit 1808. Parameter definition unit 1804 allows developers to define application parameters of an application allowing the application to be executable on a plurality of device platforms. Parameter definition unit 1804 also allows developers to define configuration parameters of the application and define modules to be included in the application. Framework unit 1808 allows developers to apply a framework to the application facilitating transportable code between a client device and a server to execute the application. Framework unit 1808 may also apply binders to the application to react to user interface events and apply controllers to the application that are bound to the binders, the controllers facilitating a response to the user interface events. The controllers serve data representing responses to user interface events to a view which corresponds to a display element of the application to facilitate display of the responses. Deployment unit 1808 deploys applications that are eventually served to client devices. The deployment unit may deploy the application to an application store, hosting platform, web server, or client device.

Figure 19:
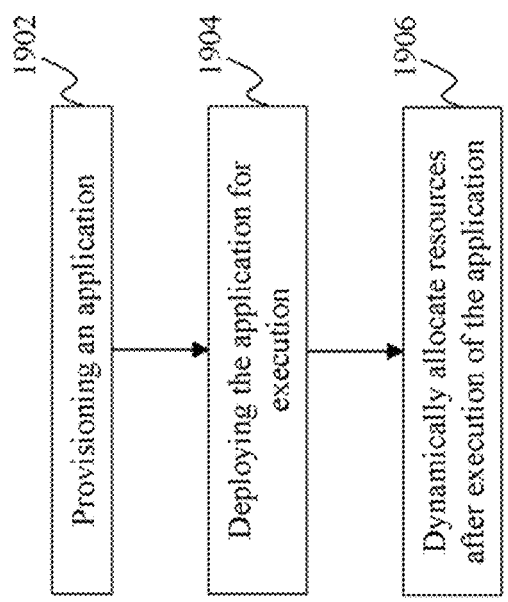
FIG. 19 depicts a flowchart of an exemplary process in which an application that is interoperable across a plurality of device platforms is deployed and hosted, in accordance with an embodiment of the present disclosure.

FIG. 19 depicts a flowchart of an exemplary process in which application hoster 816 is utilized to deploy applications, in accordance with an embodiment of the present disclosure. At 1902, an application capable of being executed in a plurality of different formats is provisioned by provisioning unit 1706. Provisioning involves deploying applications and configuring routing rules. Provisioning facilitates determining resource budgets for hosting of applications at application hoster 816.

At 1904, the application is deployed for execution by a client device and a server. Deploying the application may also be referred to as serving the application through serving unit 1702. Deployment results in the assignment of routers to handle any requests to application hoster 816. Requests received from client devices represent requests from the application or requests for application hoster 816 to carry out a function that could not be carried out at the client device. Upgrades to the application may be deployed to the routers on a rolling basis to ensure that at least some of the routers are still available to host the application while the other allocated routers are upgraded. Serving unit 1702 may generate a transition plan that shifts traffic away from a first set of routers that are to be upgraded to a second set of routers which are not currently being upgraded.

At 1906, resources are dynamically allocated after execution of the application. Execution of the application may be initiated either from the client device or through application hoster 816. Resources may be allocated in response to analytics unit 1708 analyzing the resource usage of the plurality of routers assigned to a particular application. If there is high resource usage, additional routers may be dynamically assigned to undertake the workload caused by hosting the application. If there is low resource usage, routers may be reassigned to other applications being hosted which may require more resources.

To implement the embodiments set forth herein, computer hardware platforms may be used as hardware platform(s) for one or more of the elements described herein (e.g., application builder 802, application hoster 816, memory management unit 810, and package management unit 812). The hardware elements, operating systems and programming languages of such computer hardware platforms are conventional in nature, and it is presumed that those skilled in the art are adequately familiar therewith to adapt those technologies to implement any of the elements described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment, and as a result the drawings are self-explanatory.

Figure 20:
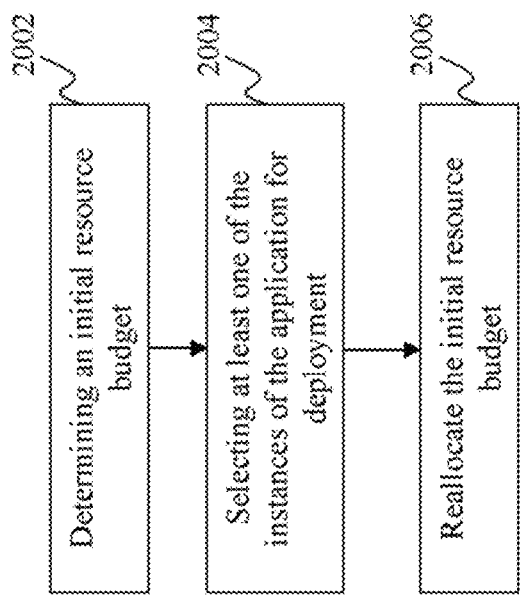
FIG. 20 depicts a flowchart of an exemplary process in an application that is interoperable across a plurality of device platforms is provisioned, in accordance with an embodiment of the present disclosure.

FIG. 20 depicts a flowchart of an exemplary process in an application that is interoperable across a plurality of device platforms is provisioned, in accordance with an embodiment of the present disclosure. At 2002, an initial resource budget for an application is determined. At 2004, at least one instance of the application is selected for deployment. At 2006, the initial resource budget is reallocated based on usage of the application.

Figure 21:
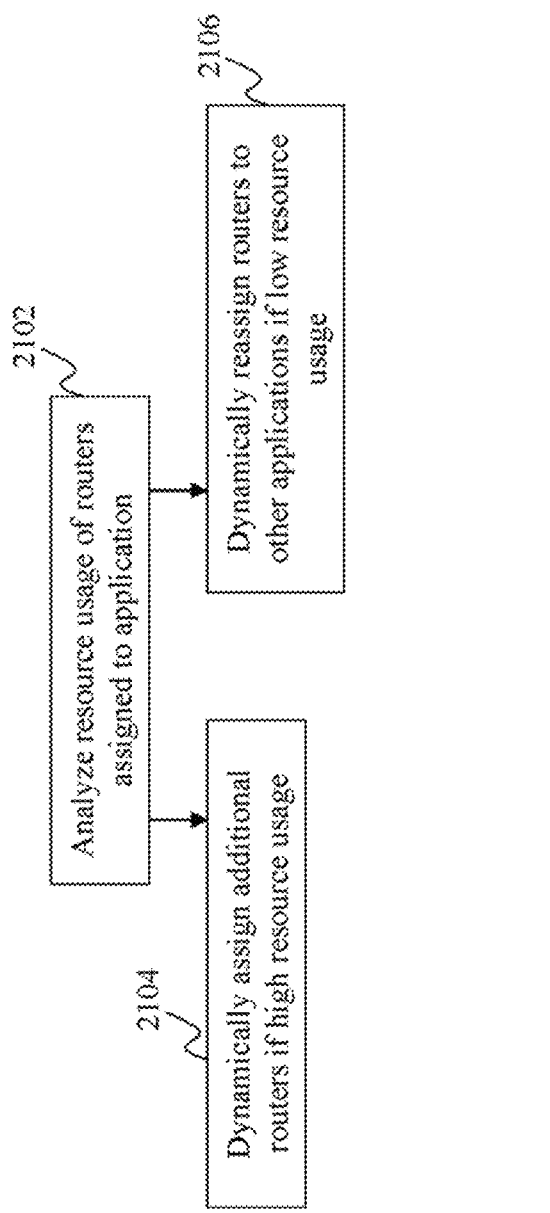
FIG. 21 depicts a flowchart of an exemplary process in which resources are allocated dynamically for execution of an application that is interoperable across a plurality of device platforms, in accordance with an embodiment of the present disclosure.

FIG. 21 depicts a flowchart of an exemplary process in which resources are allocated dynamically for execution of an application that is interoperable across a plurality of device platforms, in accordance with an embodiment of the present disclosure. At 2102, resource usage of routers assigned to handle application requests and host the application are analyzed. If high resource usage is detected, at 2104, additional routers are dynamically assigned for the particular application. If low resource usage is detected, at 2106, some of the routers may be reassigned to other applications.

Figure 22:
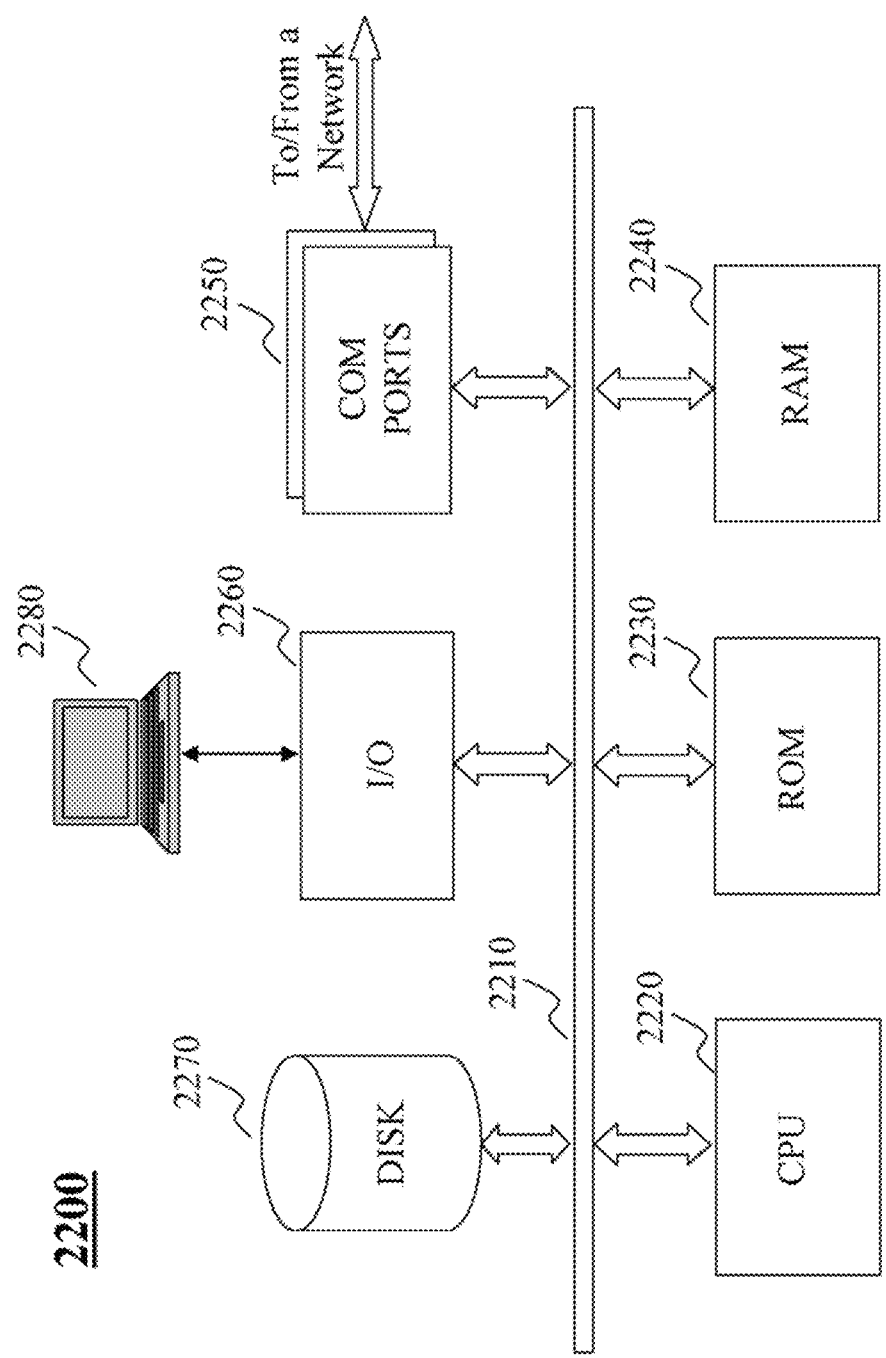
FIG. 22 depicts a general computer architecture on which the present embodiments can be implemented and has a functional block diagram illustration of a computer hardware platform, which includes user interface elements.

FIG. 22 depicts a general computer architecture on which the present teaching can be implemented and has a functional block diagram illustration of a computer hardware platform, which includes user interface elements. The computer may be a general purpose computer or a special purpose computer. This computer 1900 can be used to implement any components of the development and hosting platform described herein. For example, the application builder 802 that develops and generates applications, application hoster 816 which deploys and hosts applications, memory management unit 810 which determines memory schemes, and package management unit 812 which handles updating of packages to applications can all be implemented on a computer such as computer 2200, via its hardware, software program, firmware, or a combination thereof. Although only one such computer is shown, for convenience, the computer functions relating to development and hosting of applications may be implemented in a distributed fashion on a number of similar platforms, to distribute the processing load.

The computer 2200, for example, includes COM ports 2250 connected to and from a network connected thereto to facilitate data communications. The computer 2200 also includes a central processing unit (CPU) 2220, in the form of one or more processors, for executing program instructions. The exemplary computer platform includes an internal communication bus 2210, program storage and data storage of different forms, e.g., disk 2270, read only memory (ROM) 2230, or random access memory (RAM) 2240, for various data files to be processed and/or communicated by the computer, as well as possibly program instructions to be executed by the CPU. The computer 2200 also includes an I/O component 2260, supporting input/output flows between the computer and other components therein such as user interface elements 2280. The computer 2200 may also receive programming and data via network communications.

Hence, aspects of the methods of developing, deploying, and hosting applications that are interoperable across a plurality of device platforms, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated schedules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media includes dynamic memory, such as a main memory of such a computer platform. Tangible transmission media includes coaxial cables, copper wire, and fiber optics, including wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic take, any other magnetic medium, a CD-ROM, DVD or DVD-ROM, any other optical media, punch card paper tapes, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the embodiments of the present disclosure are amenable to a variety of modifications an/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as firmware, a firmware/software combination, a firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method implemented on a computer system that includes at least one processor, storage, and a communication platform connected to a network for deployment of applications that are interoperable across different device platforms, the method comprising:
provisioning an application capable of being executed on a plurality of different device platforms;
hosting on a server, a plurality of instances of the application for execution on a plurality of serving nodes of the server;
deploying an instance of the application for execution on a client device;
assigning at least one router to route a request associated with the deployed instance of the application from the client device to one or more serving nodes, wherein the request indicates a failure in executing the application on the client device; and
dynamically allocating at least one serving node for execution of the application on the server based on one or more criteria, wherein
the at least one serving node executes the application on the server in response to the request from the client device.

2. The method of claim 1, wherein the one or more criteria include a number of instances hosted on the server.

3. The method of claim 1, further comprising:
determining an initial resource budget for the plurality of instances of application on the server;
selecting at least one of the plurality of instances of the application for execution; and
reallocating the initial resource budget for the selected at least one instance for executing the application,
wherein the initial resource budget is a part of a total resource pool of the server.

4. The method of claim 1, further comprising:
assigning a plurality of routers to route requests associated with the deployed instance of the application;
deploying incremental upgrades related to the application to the plurality of routers on a rolling basis; and
generating a transition plan to shift traffic from a first set of the plurality of routers being upgraded to a second set of the plurality of routers not being upgraded.

5. The method of claim 1, further comprises:
analyzing resource usage of the one or more serving nodes;
dynamically allocating one or more additional serving nodes from a resource pool to execute the application in response to the analysis indicating a first level of resource usage; and
dynamically releasing the at least one serving node allocated to execute the application to the resource pool in response to the analysis indicating a second level of resource usage.

6. A machine readable non-transitory and tangible medium having information recorded for deployment of applications that are interoperable across different device platforms, wherein the information, when read by the machine, causes the machine to perform the steps comprising:
provisioning an application capable of being executed on a plurality of different device platforms;
hosting on a server, a plurality of instances of the application for execution on a plurality of serving nodes of the server;
deploying an instance of the application for execution on a client device;
assigning at least one router to route a request associated with the deployed instance of the application from the client device to one or more serving nodes, wherein the request indicates a failure in executing the application on the client device; and
dynamically allocating at least one serving node for execution of the application on the server based on one or more criteria, wherein
the at least one serving node executes the application on the server in response to the request from the client device.

7. The machine readable non-transitory and tangible medium of claim 6, wherein the one or more criteria include a number of instances hosted on the server.

8. The machine readable non-transitory and tangible medium of claim 6, wherein the machine further performs the steps comprising:
determining an initial resource budget for the plurality of instances of application on the server;
selecting at least one of the plurality of instances of the application for execution; and
reallocating the initial resource budget for the selected at least one instance for executing the application,
wherein the initial resource budget is a part of a total resource pool of the server.

9. The machine readable non-transitory and tangible medium of claim 6, wherein the machine further performs the steps comprising:
assigning a plurality of routers to route requests associated with the deployed instance of the application;
deploying incremental upgrades related to the application to the plurality of routers on a rolling basis; and generating a transition plan to shift traffic from a first set of the plurality of routers being upgraded to a second set of the plurality of routers not being upgraded.

10. The machine readable non-transitory and tangible medium of claim 6, wherein the machine further performs the steps comprising:

analyzing resource usage of the one or more serving nodes;

dynamically allocating one or more additional serving nodes from a resource pool to execute the application in response to the analysis indicating a first level of resource usage; and dynamically releasing the at least one serving node allocated to execute the application to the resource pool in response to the analysis indicating a second level of resource usage.

11. A system for deployment of applications that are interoperable across different device platforms, comprising:

a provisioning unit programmed for provisioning an application capable of being executed on a plurality of different device platforms;

a deployment unit programmed for:

hosting on a server, a plurality of instances of the application for execution on a plurality of serving nodes of the server; and deploying an instance of the application for execution on a client device; and an analytics unit programmed for:

assigning at least one router to route a request associated with the deployed instance of the application from the client device to one or more serving nodes, wherein the request indicates a failure in executing the application on the client device; and dynamically allocating at least one serving node for execution of the application on the server based on one or more criteria, wherein the at least one serving node executes the application on the server in response to the request from the client device.

12. The system of claim 11, wherein the one or more criteria include a number of instances hosted on the server.

13. The system of claim 11, wherein the provisioning unit is further programmed for:

determining an initial resource budget for the plurality of instances of application on the server;

selecting at least one of the plurality of instances of the application for execution; and reallocating the initial resource budget for the selected at least one instance for executing the application, wherein the initial resource budget is a part of a total resource pool of the server.

14. The system of claim 11, wherein the deployment unit is further programmed for:

assigning a plurality of routers to route requests associated with the deployed instance of the application;

deploying incremental upgrades related to the application to the plurality of routers on a rolling basis; and generating a transition plan to shift traffic from a first set of the plurality of routers being upgraded to a second set of the plurality of routers not being upgraded.

15. The system of claim 11, wherein the analytics unit is further programmed for:

analyzing resource usage of the one or more serving nodes;

dynamically allocating one or more additional serving nodes from a resource pool to execute the application in response to the analysis indicating a first level of resource usage; and dynamically releasing the at least one serving node allocated to execute the application to the resource pool in response to the analysis indicating a second level of resource usage.

* * * * *